United States Patent
Shimono

(10) Patent No.: US 9,203,828 B2
(45) Date of Patent: Dec. 1, 2015

(54) SERVICE USAGE MANAGEMENT METHOD, RECORDING MEDIUM, AND INFORMATION PROCESSING DEVICE

(71) Applicant: FUJITSU LIMITED, Kawasaki-shi, Kanagawa (JP)

(72) Inventor: Akio Shimono, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 190 days.

(21) Appl. No.: 13/778,857

(22) Filed: Feb. 27, 2013

(65) Prior Publication Data

US 2013/0232557 A1    Sep. 5, 2013

(30) Foreign Application Priority Data

Mar. 1, 2012   (JP) .................. 2012-045245

(51) Int. Cl.
*H04L 29/06*   (2006.01)
*G06F 21/41*   (2013.01)

(52) U.S. Cl.
CPC ............ *H04L 63/0815* (2013.01); *G06F 21/41* (2013.01)

(58) Field of Classification Search
None
See application file for complete search history.

(56) References Cited

U.S. PATENT DOCUMENTS

| | | | |
|---|---|---|---|
| 2003/0196092 A1* | 10/2003 | Raley et al. .................. 713/176 |
| 2008/0072301 A1 | 3/2008 | Chia et al. | |
| 2009/0193507 A1* | 7/2009 | Ibrahim ............................ 726/9 |
| 2009/0276622 A1* | 11/2009 | Matsuo ......................... 713/155 |
| 2010/0274859 A1* | 10/2010 | Bucuk ........................... 709/206 |
| 2011/0258682 A1* | 10/2011 | Yin ................................... 726/3 |
| 2012/0290483 A1* | 11/2012 | Hezrony ......................... 705/71 |
| 2015/0095012 A1* | 4/2015 | Bangalore ....................... 704/2 |

FOREIGN PATENT DOCUMENTS

| | | |
|---|---|---|
| EP | 0456386 A2 | 11/1991 |
| JP | 2008-506139 | 2/2008 |
| WO | WO 2006/006704 | 1/2006 |

OTHER PUBLICATIONS

Extended European Search Report issued Jun. 3, 2013 in corresponding European Application No. 13155908.0.
European Office Action dated Jun. 5, 2014 in corresponding European Patent Application No. 13155908.0.

* cited by examiner

*Primary Examiner* — Michael R Vaughan
*Assistant Examiner* — Richard McCoy
(74) *Attorney, Agent, or Firm* — Staas & Halsey LLP

(57) ABSTRACT

A service usage management method executed by an information processing device, the service usage management method includes receiving, from a terminal device used by a user, a piece of authentication information which authenticates a user's right to use a service provided by a device as an issuing source and includes a number of times of issuing processing for issuing, based on a piece of authentication information, another piece of authentication information and an identifier of the device as the issuing source, generating the authentication information which includes the number of times of addition of adding one to the number of times indicated in the received authentication information and the identifier of the information processing device and authenticates the user's right to use the service provided by the information processing device, and transmitting the generated authentication information to the terminal device.

11 Claims, 32 Drawing Sheets

| PARTNER'S URL | RELATIONSHIP WITH PARTNER |
|---|---|
| https://abc.example.com/ | BUSINESS PARTNER |
| https://def.example.net/sub1/ | SUBSIDIARY COMPANY |
| https://def.example.net/sub1/ | CONSOLIDATED COMPANY |
| ⋮ | ⋮ |

| RELATIONSHIP WITH PARTNER | ROLE AUTHENTICATED BY PARTNER | CHAIN THRESHOLD VALUE | ROLE AUTHENTICATED BY SERVER 100 |
|---|---|---|---|
| BUSINESS PARTNER | SUPERVISORY EMPLOYEE | 1 | SUPERVISORY EMPLOYEE OF BUSINESS PARTNER |
| SUBSIDIARY COMPANY | EMPLOYEE | 1 | EMPLOYEE OF SUBSIDIARY COMPANY |
| SUBSIDIARY COMPANY | EMPLOYEE OF SUBSIDIARY COMPANY | 2 | EMPLOYEE OF SUB-SUBCONTRACTOR |
| CONSOLIDATED COMPANY | CONSOLIDATED COMPANY | − | EMPLOYEE OF CONSOLIDATED COMPANY |
| ... | ... | ... | ... |

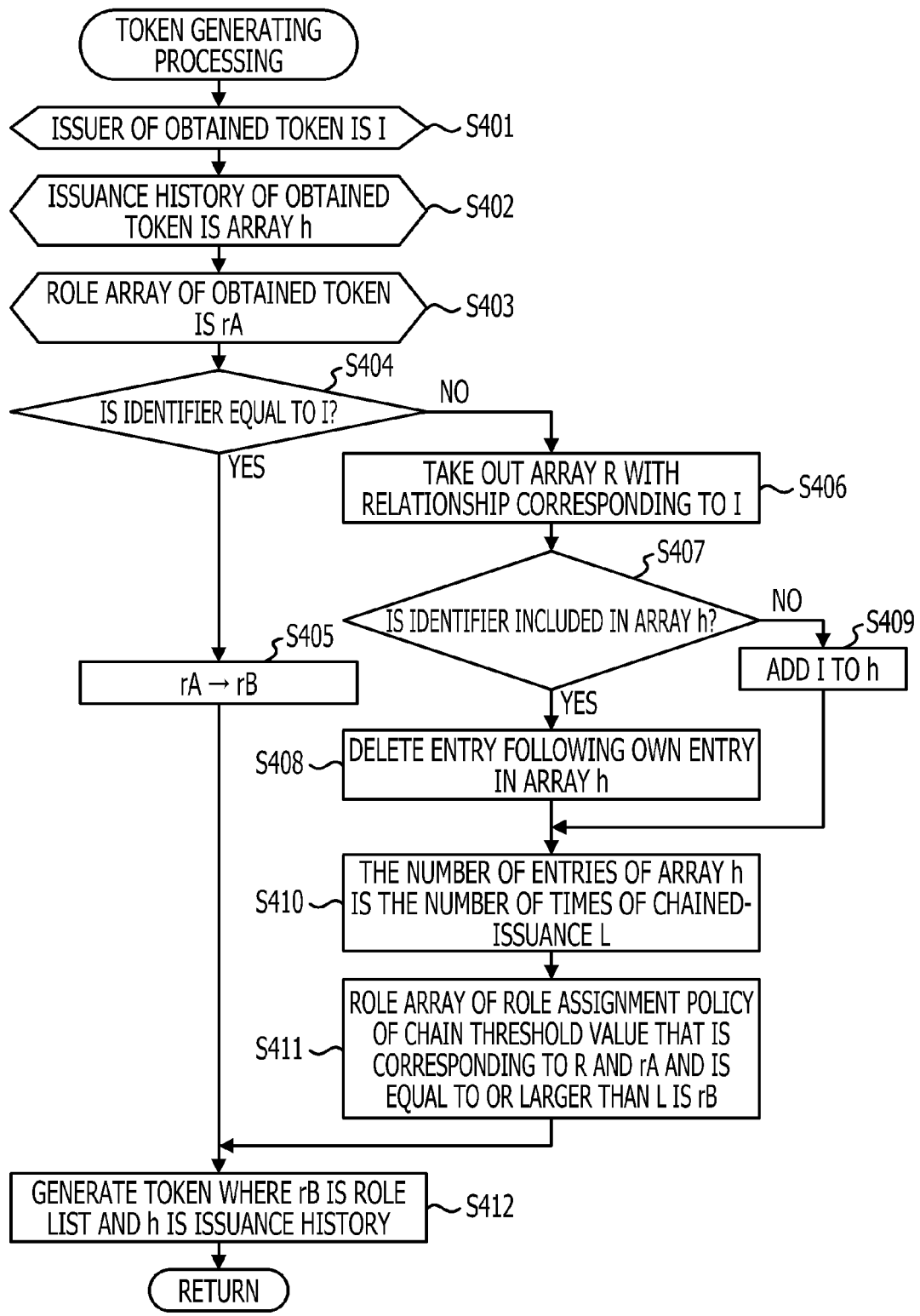

SERVICE USAGE MANAGEMENT METHOD, RECORDING MEDIUM, AND INFORMATION PROCESSING DEVICE

CROSS-REFERENCE TO RELATED APPLICATIONS

This application is based upon and claims the benefit of priority of the prior Japanese Patent Application No. 2012-045245, filed on Mar. 1, 2012, the entire contents of which are incorporated herein by reference.

FIELD

The embodiments discussed herein are related to a service usage management method, a recording medium, and an information processing device.

BACKGROUND

A user, who receives provision of service from a server on a computer network, may use the service provided by each of a plurality of servers. In this case, if the user receives individual authentication in each of the servers individually every time the user receives the provision of service, the burden of the user is increased. In this case, each of the servers individually manages account information of all the users to which the server provides the service, management load of a manager of the server is increased.

There is a technique called Single Sign-On. Single Sign-On is an authentication technique for using resources on a plurality of computers by a single action of authentication processing. In general, according to Single Sign-On, in a server having a prescribed relationship with another server in which a user is authenticated, the service is provided to the user without the user authentication in the server. For example, there is a technique for enabling Single Sign-On for accessing a plurality of networks existing in a plurality of domains. For example, Japanese National Publication of International Patent Application No. 2008-506139 is disclosed as the related art.

SUMMARY

According to an aspect of the invention, a service usage management method executed by an information processing device, the service usage management method includes receiving, from a terminal device used by a user, a piece of authentication information which authenticates a user's right to use a service provided by a device as an issuing source and includes a number of times of issuing processing for issuing, based on a piece of authentication information, another piece of authentication information and an identifier of the device as the issuing source, generating the authentication information which includes the number of times of addition of adding one to the number of times indicated in the received authentication information and the identifier of the information processing device and authenticates the user's right to use the service provided by the information processing device, and transmitting the generated authentication information to the terminal device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 24 is a diagram illustrating an example of a data structure of a relationship definition table according to the fourth embodiment;

FIG. 25 is a diagram illustrating an example of a data structure of a role assignment policy definition table;

FIG. 32 is a flowchart illustrating an example of the token generating processing according to the fifth embodiment.

DESCRIPTION OF EMBODIMENTS

After performing the user authentication, the server may issue information that authenticates that the server has the right to use the service (hereinafter referred to as authentication information) to the user. In this case, by transmitting a request attached with the issued authentication information to the server, the user may receive the provision of service from the server. If the authentication information issued by a server is usable by another server, the user is able to use the service of the plurality of servers simply if the user is authenticated by a single server.

For example, the user transmits, to a second server, the authentication information that is issued by a first server by which the user is authenticated. Based on the authentication information attached to a processing request, the second server authenticates that the user has the right to use the service. The second server chained-issues, to the user, the authentication information that allows the user to use the service thereof. By using the authentication information issued by the second server, the user is able to receive the provision of service from the second server. In the configuration of the above-described system, the user is able to receive the provision of service from a third server by using the authentication information that is chained-issued by the second server and receiving the chained-issuance of the authentication information from the third server.

However, if the above-described chained-issuance of the authentication information is permitted with no limitation, a range of the server in which the user may receive the provision of service is unlimited. This means that from the point of view of the manager of the server there is a possibility that the range of users who are able to use the server is expanded so that unreliable users may use the server. To prevent the unlimited repeat of the chained-issuance of the authentication information, the number of times of the chained-issuance of the authentication information may be limited. At the present moment, however, there is no technique for obtaining the number of times of the chained-issuance of the authentication information.

With reference to the diagrams, the embodiments will be described below. The embodiments may be combined to be applied within the consistent range. A first embodiment will be described below. According to the first embodiment, when the device chained-issues authentication information that authenticates the right to user a service provided based on the authentication information issued to a user who is authenticated by another device, the device counts up the number of times of the chained-issuance of the authentication information.

Figure 1:
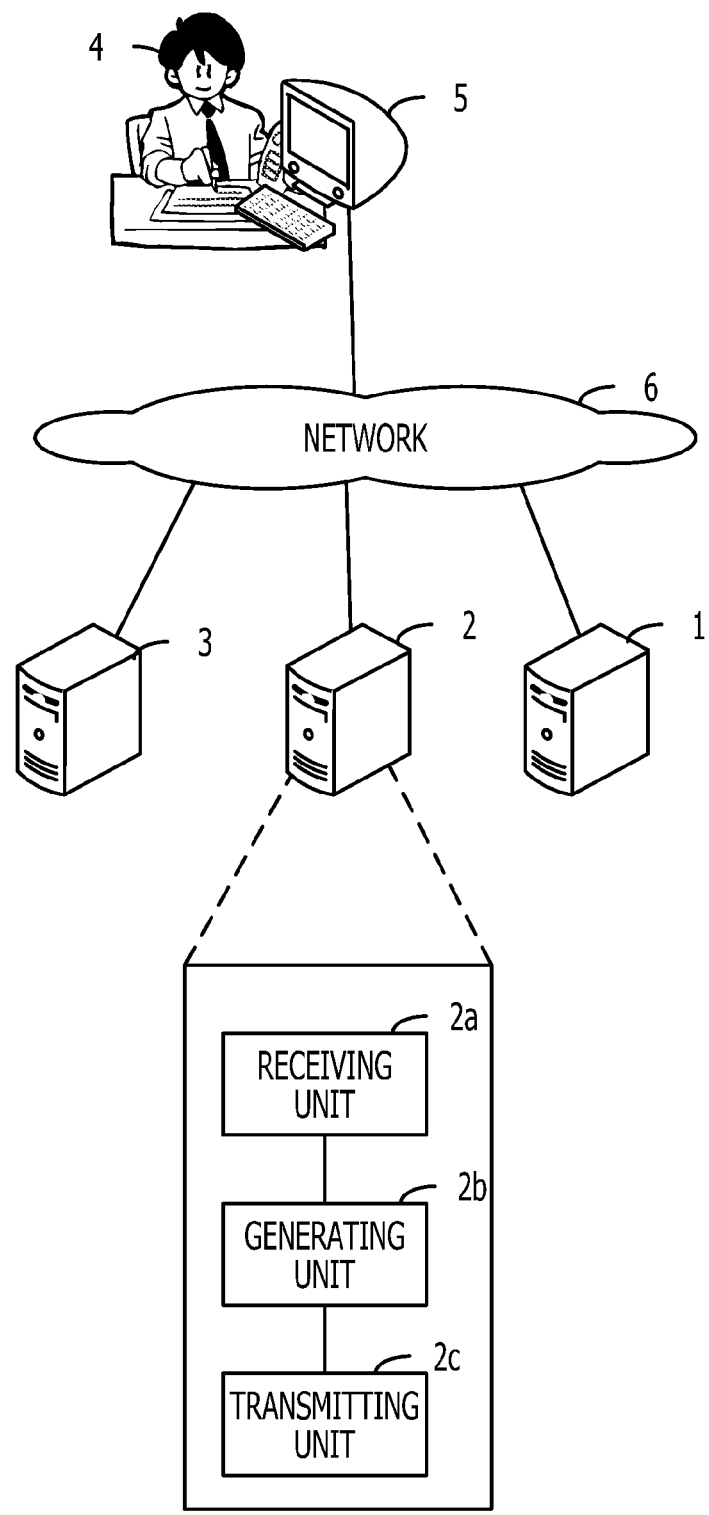
FIG. 1 is a diagram illustrating an example of a configuration of a system according to a first embodiment.

FIG. 1 is a diagram illustrating an example of a configuration of a system according to the first embodiment. According to the first embodiment, information processing devices 1 to 3 are coupled, through a network 6, to a terminal device 5 that is used by a user 4. The information processing devices 1 to 3 provide services in response to a request from the terminal device 5. The user 4 uses the service provided by the information processing devices 1 to 3 by using the terminal device 5. Each of the information processing devices 1 to 3 has a user authentication function based on account information registered in advance. The information processing devices 1 to 3 may issue authentication information that authenticates the user's right to use the service provided in the devices thereof to the user who performs the user authentication.

Based on the authentication information issued by the other device, the information processing devices 1 to 3 may chained-issue the authentication information that authenticates the user's right to use the services provided in the device. To chained-issue the authentication information, the information processing devices 1 to 3 set the number of times of the chained-issuance of the authentication information in the authentication information. FIG. 1 representatively illustrates a function for chained-issuing the authentication information in the information processing device 2.

The information processing device 2 includes a receiving unit 2a, a generating unit 2b, and a transmitting unit 2c to chained-issue the authentication information. The receiving unit 2a receives, from the terminal device 5 used by the user 4, the authentication information that authenticates the user's right to use the service provided by the device as an issuing source. The authentication information includes the number of times of chained-processing, based on a piece of authentication information, for issuing another piece of authentication information performed and an identifier of the device as the issuing source.

If the identifier of the device as the issuing source of the received authentication information is the identifier other than the identifier of the information processing device, the generating unit 2b generates authentication information that authenticates the right of the user 4 corresponding to the service provided by the information processing device 2. The generated authentication information includes the number of times of addition of adding one to the number of times indicated in the received authentication information and the identifier of the information processing device 2.

The transmitting unit 2c transmits the generated authentication information to the terminal device 5. The information processing devices 1 and 3 have the functions equivalent to the information processing device 2. The receiving unit 2a and the generating unit 2b, and the transmitting unit 2c may be achieved by a processor such as a Central Processing Unit (CPU) included in the information processing device. The line used to couple the elements illustrated in FIG. 1 indicates part of a communication path. Communication paths other than the communication path illustrated in FIG. 1 may be set.

Figure 2:
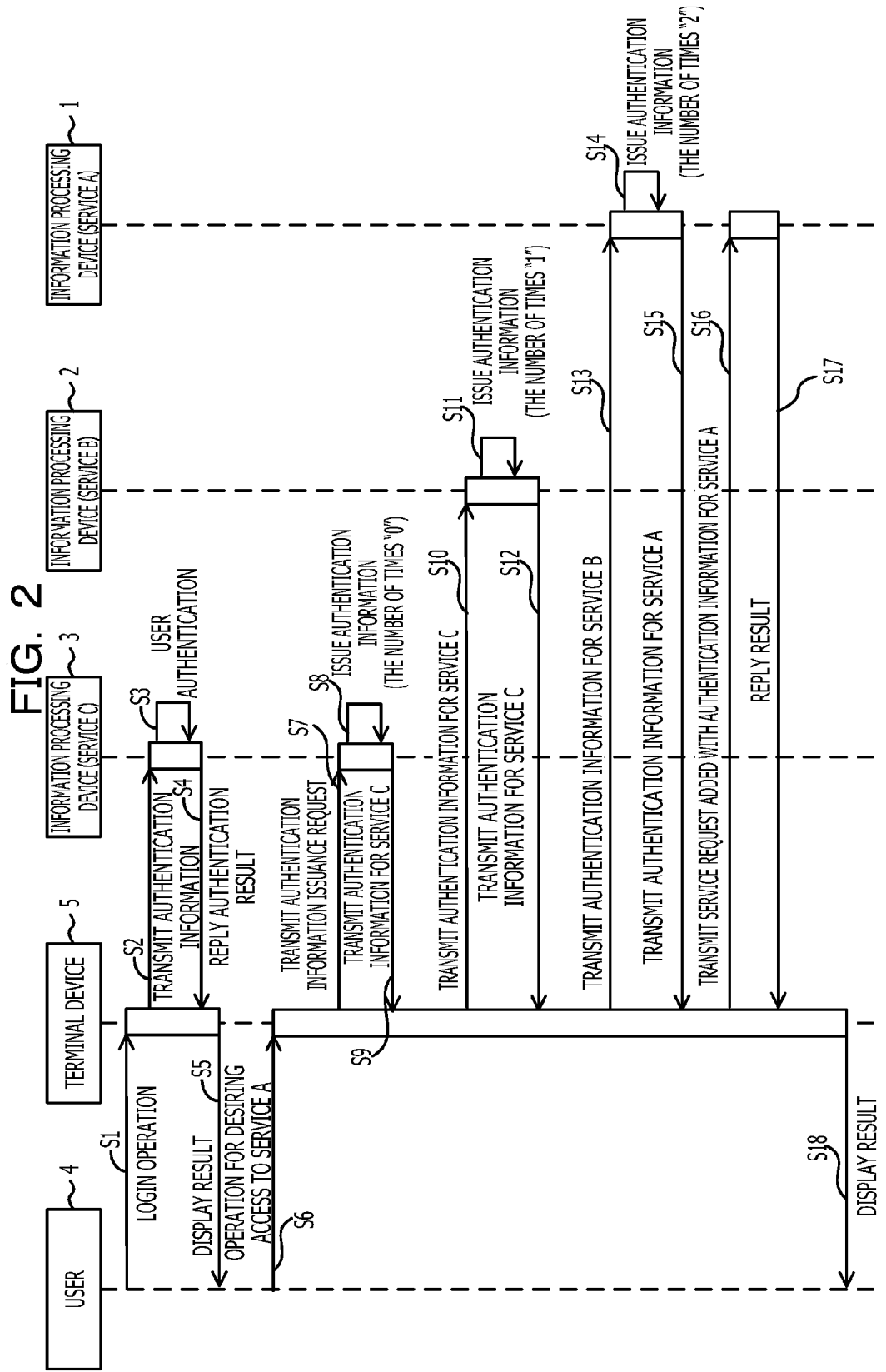
FIG. 2 is a sequence diagram illustrating an example of chained-issuing processing of authentication information according to the first embodiment.

A procedure of the chained-issuing processing of the authentication information will be described below with reference to an example of the case where the user 4 receives the user authentication in the information processing device 3 and uses the service of the information processing device 1. FIG. 2 is a sequence diagram illustrating an example of the procedure of the chained-issuing processing of the authentication information according to the first embodiment. In the example illustrated in FIG. 2, the service provided by the information processing device 1 is referred to as "service A," the service provided by the information processing device 2 is referred to as "service B," and the service provided by the information processing device 3 is referred to as "service C." The processing illustrated in FIG. 2 will be described according to the order of the operation numbers.

[Operation S1] The user 4 performs login operation to the information processing device 3 with respect to the terminal device 5. For example, the user 4 inputs the authentication information (a user ID and a password) into the terminal device 5.

[Operation S2] The terminal device 5 transmits the authentication information to the information processing device 3.

[Operation S3] The information processing device 3 performs the user authentication based on the authentication information. For example, the information processing device 3 determines whether previously registered account information includes the account information that matches the authentication transmitted from the terminal device 5. If the corresponding account information is included, the information processing device 3 authenticates that the user 4 is the user corresponding to the account information.

[Operation S4] If the user authentication is successful, the information processing device 3 replies an authentication result to the terminal device 5.

[Operation S5] The terminal device 5 displays the authentication result on a monitor or the like.

[Operation S6] When recognizing that the user authentication is successful, the user 4 performs operation for desiring an access to the service A with respect to the terminal device 5. [Operation S7] In response to the operation of the user 4, the terminal device 5 transmits an authentication information issuance request to the information processing device 3 that performed the user authentication. For example, the transmission of the authentication information issuance request and the transmission of the authentication information are performed in substantially the same session.

[Operation S8] In response to the authentication information issuance request from the user 4 that performs the user authentication, the information processing device 3 issues the authentication information that authenticates the right of the user 4 to use the service C. For example, after receiving the authentication information issuance request in the same session as in which the authentication information is received, the information processing device 3 recognizes that the authentication information is the authentication information issuance request from the user that performs the user authentication. In the authentication information issued at this time, "0" is set as the number of times of the chained-issuing processing of the authentication information. The authentication information includes the identifier of the information processing device 3 as the identifier of the device as the issuing source.

[Operation S9] The information processing device 3 transmits the issued authentication information for the service C to the terminal device 5. [Operation S10] The terminal device 5 transmits the authentication information for the service C to the information processing device 2. For example, the terminal device 5 adds the authentication information for the service C to the authentication information issuance request and transmits, to the information processing device 2, the authentication information issuance request that includes the authentication information for the service C.

[Operation S11] The information processing device 2 confirms that the authentication information is issued by the information processing device 3 and then chained-issues the authentication information that authenticates the right to use the service B thereof. In the authentication information issued at this time, "1" is set as the number of times of the chained-issuing processing of the authentication information.

For example, in the information processing device 2, the receiving unit 2a receives the authentication information transmitted from the terminal device 5. The receiving unit 2a transfers the received authentication information to the generating unit 2b. Since the identifier of the information processing device 3 is set as the identifier of the device as the issuing source in the obtained authentication information, the generating unit 2b recognizes that the obtained authentication information is issued by a device other than the information processing device 3. The generating unit 2b generates the authentication information that authenticates the right of the user 4 to use the service B provided by the information processing device 2. The generated authentication information includes the number of time of addition of adding one to the number of times indicated in the received authentication information and the identifier of the information processing device 2. The number of times indicated in the received authentication information for the service C is "0." Therefore, the number of times "1" is set to the authentication information that is generated by the generating unit 2b. The generating unit 2b gives the generated authentication information to the transmitting unit 2c.

[Operation S12] The transmitting unit 2c of the information processing device 2 transmits the authentication information generated by the generating unit 2b to the terminal device 5.

[Operation S13] The terminal device 5 transmits the authentication information for the service B to the information processing device 1. For example, the terminal device 5 adds the authentication information for the service B to the authentication information issuance request and then transmits, to the information processing device 1, the authentication information issuance request that includes the authentication information for the service B.

[Operation S14] The information processing device 1 confirms that the authentication information is issued by the information processing device 2 and then chained-issues the authentication information that authenticates the right to use the service A thereof. In the authentication information issued at this time, "2" is set as the number of times of the chained-issuing processing of the authentication information. The details of the chained-issuing processing of the authentication information by the information processing device 1 are substantially the same as the details of the processing of Operation S11 by the information processing device 2.

[Operation S15] The information processing device 1 transmits the authentication information for the server A to the terminal device 5.

[Operation S16] The terminal device 5 transmits a service request added with the authentication information for the service A to the information processing device 1.

[Operation S17] Since the service request is added with the authentication information for the service A, the information processing device 1 determines that the service request is transmitted from the user having the right to use the service A and then performs the processing according to the service request. The information processing device 1 replies a processing result of the processing to the terminal device 5.

[Operation S18] The terminal device 5 displays the processing result replied from the information processing device 1. In this manner, when the chained-issuance of the authentication information is performed, the number of times of the chained-issuance of the authentication information may be added to the authentication information. As a result, in each of the information processing devices, the number of times of the chained-issuance of the authentication information is able to be obtained, and various types of control may be performed based on the number of times. For example, if the number of times of the chained-issuance of the authentication information indicated in the received authentication information is larger than a threshold value that is previously set, the issuance of the authentication information may be suppressed.

According to the first embodiment, if the device as the issuing source of the received authentication information is another device, each of the information processing devices 1 to 3 issues the authentication information obtained by incrementing the number of times of the chained-issuing processing of the authentication information. Due to this, the number of times of the issuance may be prevented from being counted up if the same information processing device repeatedly issues the authentication information. As a result, the number of times of the chained-issuance of the authentication information between the related devices may be accurately obtained. That is, even if the same information processing device repeatedly issues the authentication information, the range of the server in which the user is able to receive the provision of service is not expanded. Therefore, if the number of times of the issuance is prevented from being counted up when the same information processing device repeatedly issues the authentication information, the number of times of the issuance is counted up if the range of the server in which the user is able to receive the provision of service is expanded. The number of times of the issuance obtained as described above appropriately indicates the range of the server in which the user may receive the provision of service.

A second embodiment will be described below. According to the second embodiment, a counter of the number of times of the chained-issuance of the authentication information is provided in the authentication information that authenticates the right to use the service. According to the second embodiment, a token is used as an example of the authentication information. In addition to an issuer and the number of times of the chained-issuance, an electronic signature may be added to the token. According to the second embodiment, each server counts up the value of the counter every time the chained-issuance of the token is performed.

Figure 3:
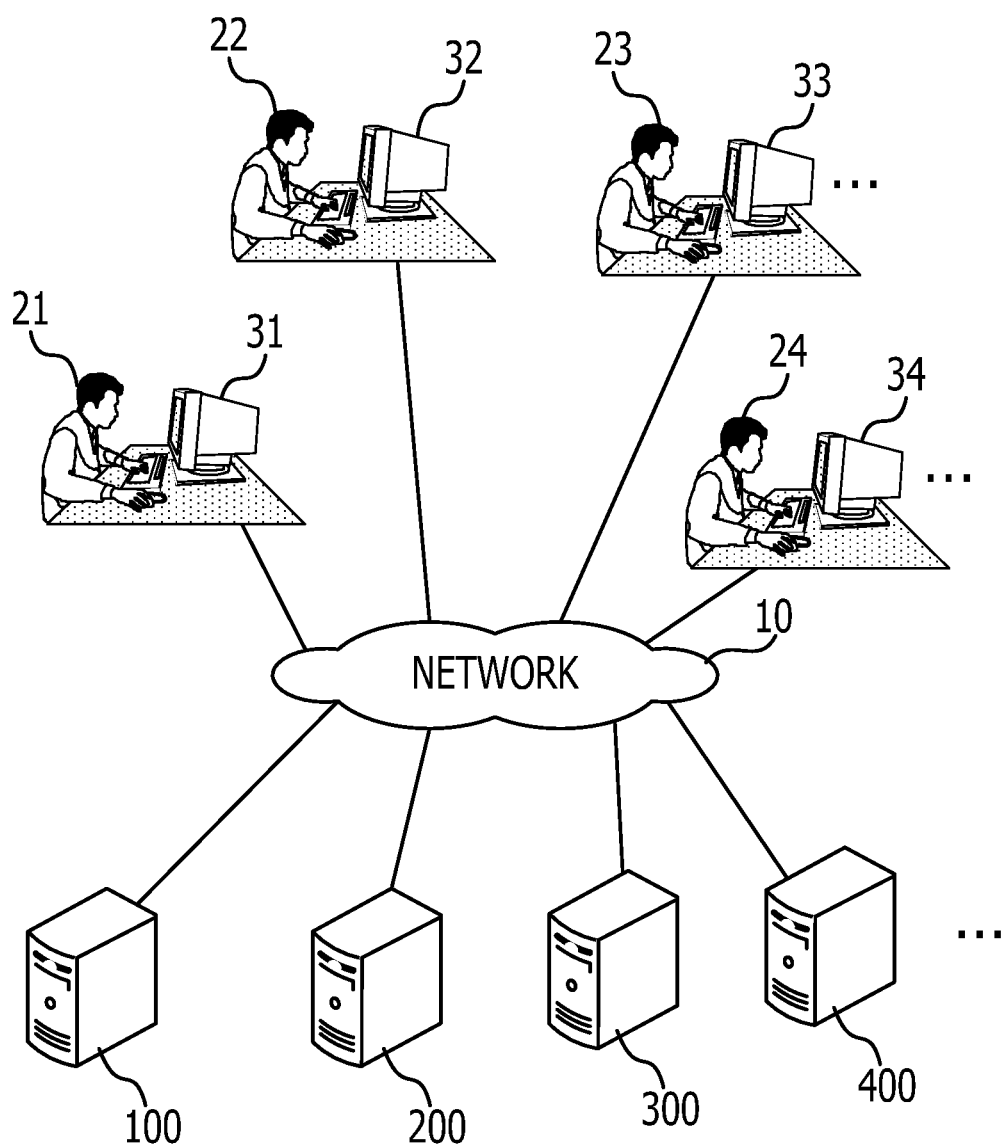
FIG. 3 is a diagram illustrating an example of a configuration of a system according to a second embodiment.

FIG. 3 is a diagram illustrating an example of a configuration of a system according to the second embodiment. According to the second embodiment, servers 100, 200, 300, 400, and etc. are coupled to each other through a network 10. The network 10 is coupled to users 21, 22, 23, 24, and etc., and terminal devices 31, 32, 33, 34, and etc.

Each of the users 21, 22, 23, 24, and etc. has a user account in at least one of the servers 100, 200, 300, 400, and etc. For example, the user 21 has a user account in the server 100. The user 22 has a user account in the server 200. The user 23 has a user account in the server 300. The user 24 has a user account in the server 400.

Each of the servers 100, 200, 300, 400, and etc. manages account information related to a user having the user account in the server thereof. The account information includes authentication information and role information of the user. The authentication information is, for example, a pair of a user ID and a password.

Figure 4:
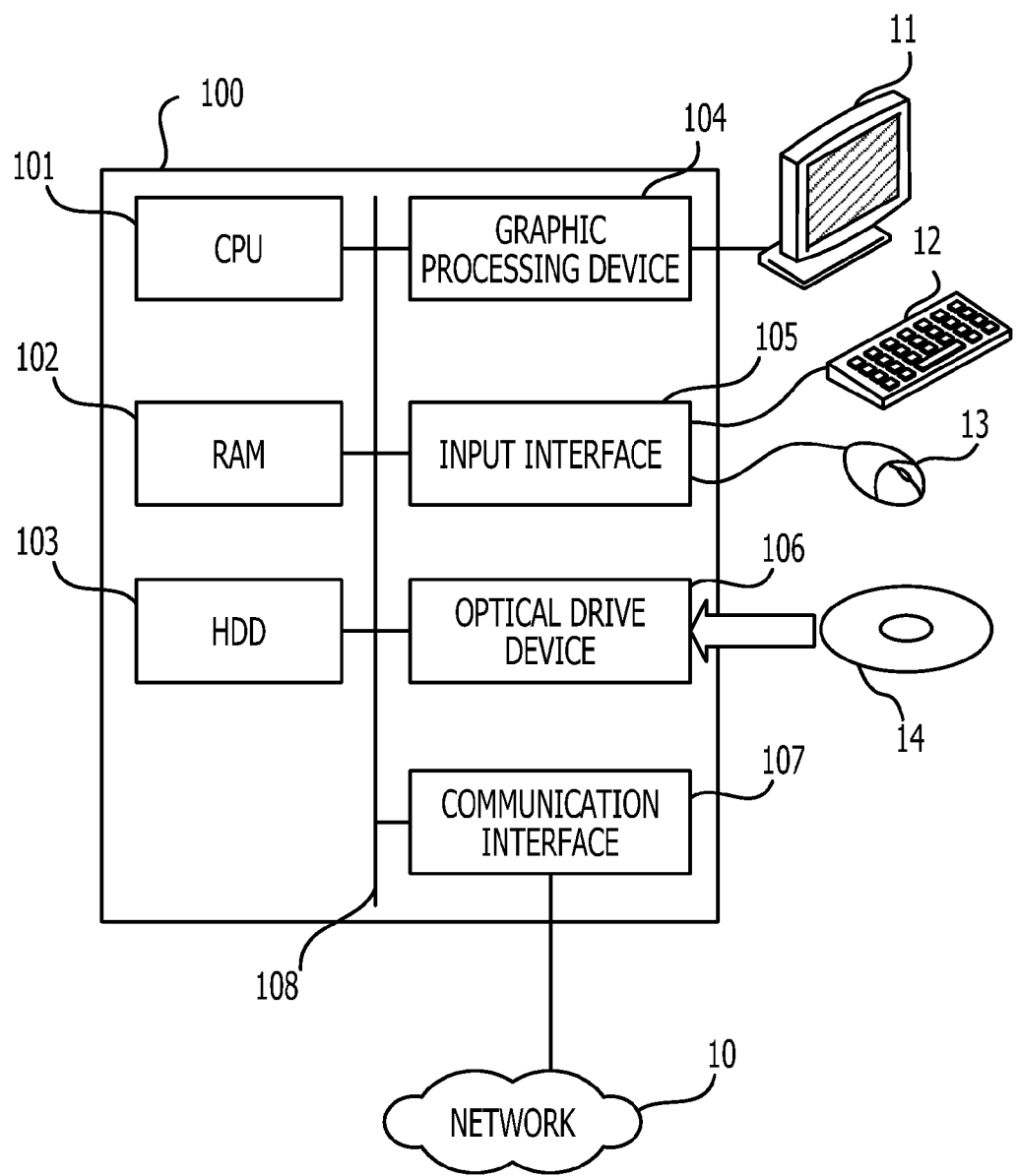
FIG. 4 is a diagram illustrating an example of hardware of a computer used in the embodiments.

FIG. 4 is a diagram illustrating an example of a configuration of hardware of a computer used in the second embodiment. The server 100 is entirely controlled by a CPU 101. The CPU 101 is coupled to a Random Access Memory (RAM) 102 and a plurality of peripheral apparatuses through a bus 108. The number of CPUs included in the server 100 is not limited to one. The number of CPUs included in the server 100 may be plural. If the server 100 includes a plurality of CPUs, the plurality of CPUs operates in cooperation to control the entire device.

The RAM 102 is used as a main storage device of the server 100. The RAM 102 temporally stores at least some programs or application programs of an Operating System (OS) to be executed by the CPU 101. The RAM 102 stores various types of data desired for the processing to be performed by CPU 101.

The peripheral apparatuses coupled to the bus 108 are, for example, a Hard Disk Drive (HDD) 103, a graphic processing device 104, an input interface 105, an optical drive device 106, and a communication interface 107.

The HDD 103 magnetically writes and reads out the data into and from a mounted disk. The HDD 103 is used as a secondary storage device of the server 100. The HDD 103 stores the programs, application programs, and various types of data of the OS. The secondary storage device is a semiconductor storage device such as a flash memory, for example.

The graphic processing device 104 is coupled to a monitor 11. The graphic processing device 104 displays an image on a screen of the monitor 11 in accordance with an order from the CPU 101. The monitor 11 is a display device or a liquid crystal display device using a Cathode Ray Tube (CRT), for example.

A keyboard 12 and a mouse 13 are coupled to the input interface 105. The input interface 105 transmits, to the CPU 101, a signal that is transmitted from the keyboard 12 or the mouse 13. The mouse 13 is an example of a pointing device. Other pointing devices may be used. The other pointing devices are, for example, a touch panel, a tablet, a touch pad, a traffic ball, and the like.

The optical drive device 106 uses a laser light and the like to read out the data recorded in an optical disk 14. The optical disk 14 is a portable recording medium that records the data so that the data is readable by reflection of light. The optical disk 14 is, for example, a Digital Versatile Disc (DVD), DVD-RAM, CD-ROM (Compact Disc Read Only Memory), a CD-R (Recordable)/RW (ReWritable), or the like.

The communication interface 107 is coupled to the network 10. The communication interface 107 transmits and receives the data to and from another computer or a communication apparatus through the network 10.

The above-described hardware configuration may achieve the processing function according to the second embodiment. FIG. 4 illustrates the hardware configuration of the server 100. The servers 200, 300, 400, and etc. and the terminal devices 31, 32, 33, 34, and etc. may be achieved by the similar hardware. The information processing device 1 illustrated in the first embodiment may be achieved by the hardware equivalent to the server 100 illustrated in FIG. 4.

Figure 5:
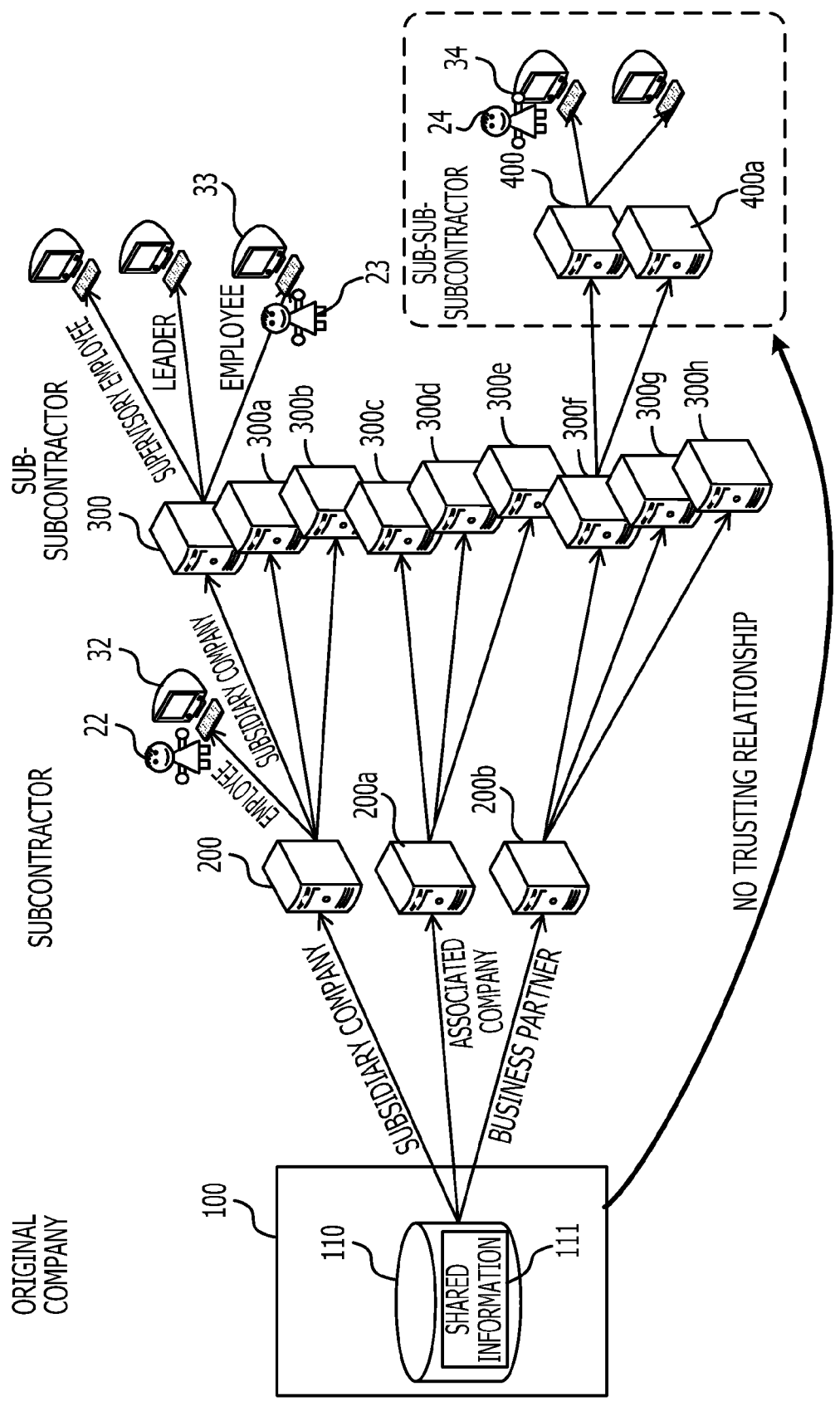
FIG. 5 is a diagram illustrating an example of operation for executing a plurality of service in cooperation.

An example of the service provided according to the second embodiment will be described below. FIG. 5 is a diagram illustrating an example of operation for performing a plurality of service in cooperation. FIG. 5 illustrates a cooperation example of service in a typical software development project.

For example, the software development project is processed by one original company, three subcontractors, nine sub-subcontractors, and two sub-sub-subcontractors. Each of the companies has a plurality of project workers.

The server 100 is managed by an original company. The servers 200, 200a, and 200b are managed by a subcontractor. Servers 300, 300a, 300b, 300c, 300d, 300e, 300f, 300g, and 300h are managed by a sub-sub contractor. Servers 400 and 400a are managed by a sub-sub-sub contractor. Each of the servers registers the account information (for example, a user ID and a password) of the project worker in the managing company. Each of the servers uses the registered information to perform the user authentication of supervisory employees or employees of the company that manages the server.

In the example illustrated in FIG. 5, a shared information 111 related to the software development project is stored in a database (DB) 110 of the server 100. To smoothly proceed a project, it is effective to share information as much as possible among the members involved in the project. However, the original company is unable to disclose the shared information 111 to a reliable partner in maintaining the secrecy of the information.

In FIG. 5, the servers between the companies having a direct trusting relationship are coupled with arrows. For example, the original company has various types of relationship with subcontractors. For example, the relationship is made with a subsidiary company, an associated company, a business partner, and the like. Similarly, the subcontractor has various types of relationship with sub-subcontractors. Further, the sub-subcontractor has various types of relationship with sub-sub-subcontractors. Accordingly, the trusting relationship between the original company and a sub-sub-subcontractor is considerably tenuous. The example in FIG. 5 illustrates a case where the original company trusts the subcontractor and the sub-subcontractor in maintaining the secrecy of the information, but the sub-sub-subcontractor is not worth trusting.

According to the second embodiment, each of the servers in the system issues, to the user who performs the user authentication based on the account information managed by the server, a token indicating that the right to use the service provided by the server exists. Each of the servers chained-issues, also to the user having the token issued by the server managed by the company having the direct trusting relationship, the token indicating that the right to use the service provided by the server exists. By the above-described chained-issuance of the token, for example, the shared information 111 managed by the server 100 of the original company is accessible by the user 22 as an employee of the subcontractor or the user 23 as an employee of the sub-subcontractor.

The original company has no trusting relationship with the sub-sub-subcontractor. Therefore, the original company limits the partner of the provision of service on the assumption that the token may be issued to an inappropriate user due to bad faith or with gross negligence in the server 400 of the sub-sub-subcontractor. According to the second embodiment, with respect to the user 24 as an employee of the sub-sub-subcontractor, to block the access to the shared information 111, the token issued by each of the servers is added with the number of times of the chained-issuance of the token. If the number of times of the chained-issuance of the token is equal to or larger than the a prescribed number, the server 100 rejects the provision of an access service to the shared information 111 even if the user has the token issued by the server of the subcontractor. In this manner, the effective service provision is performed by the chained-issuance of the token, and undesired expansion of the service provision receiver may be suppressed.

Figure 6:
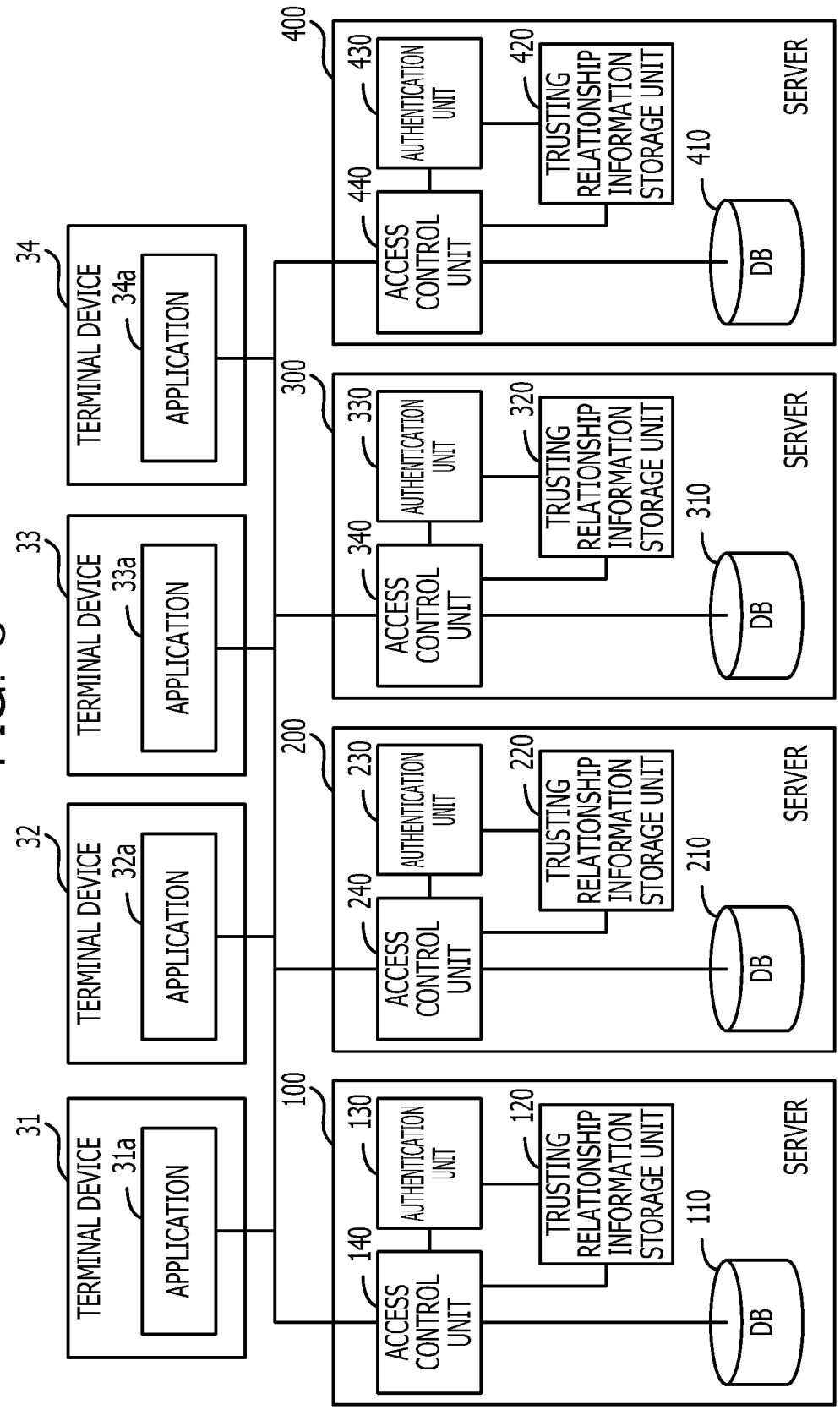
FIG. 6 is a diagram illustrating an example of a function of each device according to the second embodiment.

The function of each of the servers to achieve the above-described service provision management will be described below. FIG. 6 is a diagram illustrating an example of the function of each device according to the second embodiment. The terminal device 31 executes an application 31a. The application 31a is a function that is achieved where the terminal device 31 executes application software. According to the operation input from the user 21, the application 31a transmits a service request to a server and uses the service in a range corresponding to a role determined by each server. Before transmitting the service request to the server, the application 31a transmits a token issuance request to the server and obtains a token that includes a role on the service provided by the server. The token is information that authenticates that the user has the right to use the service provided by the server within the range according to the determined role. The application 31a may transmit an authentication request to the server of which the account is held by the user 21 and receive the user authentication.

Similarly, the terminal devices 32, 33, and 34 execute the applications 32a, 33a, and 34a, respectively. Each of the applications 32a, 33a, and 34a has the configuration equivalent to the application 31a of the terminal device 31.

The server 100 includes the DB 110, a trusting relationship information storage unit 120, an authentication unit 130, and an access control unit 140. The DB 110 stores the data provided by a data provision service. For example, part of a storage area in the HDD 103 is used as the DB 110.

The trusting relationship information storage unit 120 stores authentication information of the user having the account of the server 100, an identifier of the server having the direct trusting relationship, and the like. For example, part of the storage area of the RAM 102 or the HDD 103 is used as the trusting relationship information storage unit 120.

The authentication unit 130 refers to the trusting relationship information storage unit 120 to authenticate the user who desires a service. For example, in response to the authentication request transmitted from the terminal device 31, the authentication unit 130 determines whether the authentication information included in the authentication request is correct. The authentication information is, for example, a pair of a user ID and a credential. The credential is biological information such as, for example, a password, user's fingerprint information, palm vein information, and the like.

In response to the token issuance request transmitted from the terminal device 31, the authentication unit 130 issues a token to the user 21 who uses the terminal device 31. The authentication unit 130 outputs the generated token as a processing result.

Further, in response to the token issuance request, the authentication unit 130 refers to the trusting relationship information storage unit 120 and then confirms that the token issuance request is transmitted from the user who is able to use the service provided by the server 100. If the token issuance request is transmitted from the user who is able to use the service provided by the server 100, the authentication unit 130 generates a token that authenticates the right to use the service provided by the server 100. The authentication unit 130 outputs the generated token as the processing result. The user who is able to use the service provided by the server 100 is a user who performs the user authentication in the server 100 or a user who has the token issued by the server having the direct trusting relationship. If the number of times of the chained-issuance included in the token is larger than a prescribed threshold value, the provision of service to the user by the server 100 even the user has the token issued by the server having the direct trusting relationship.

In response to the service request added with the token indicating the right to use the service provided by the server 100, the access control unit 140 extracts information from the DB 110 and then transmits the extracted information to the terminal device 31. When receiving the authentication request or the token issuance request from the terminal device 31, the access control unit 140 gives the authentication request or the token issuance request to the authentication unit 130. When receiving the processing result according to the authentication request or the token issuance request from the authentication unit 130, the access control unit 140 transmits the received result to the terminal device 31.

The server 200 includes a DB 210, a trusting relationship information storage unit 220, an authentication unit 230, and an access control unit 240. Similarly, the server 300 includes a DB 310, a trusting relationship information storage unit 320, an authentication unit 330, and an access control unit 340. Similarly, the server 400 includes a DB 410, a trusting relationship information storage unit 420, an authentication unit 430, and an access control unit 440. The elements in the servers 200, 300, and 400 have the functions equivalent to the elements of the server 100.

The lines used to couple the elements illustrated in FIG. 6 indicate part of the communication path. Communication paths other than the communication path illustrated in FIG. 6 may be set. The authentication units 130, 230, 330, and 430 illustrated in FIG. 6 are examples of the functions that include the receiving unit 2a, the generating unit 2b, and the transmitting unit 2c according to the first embodiment.

Figure 7:
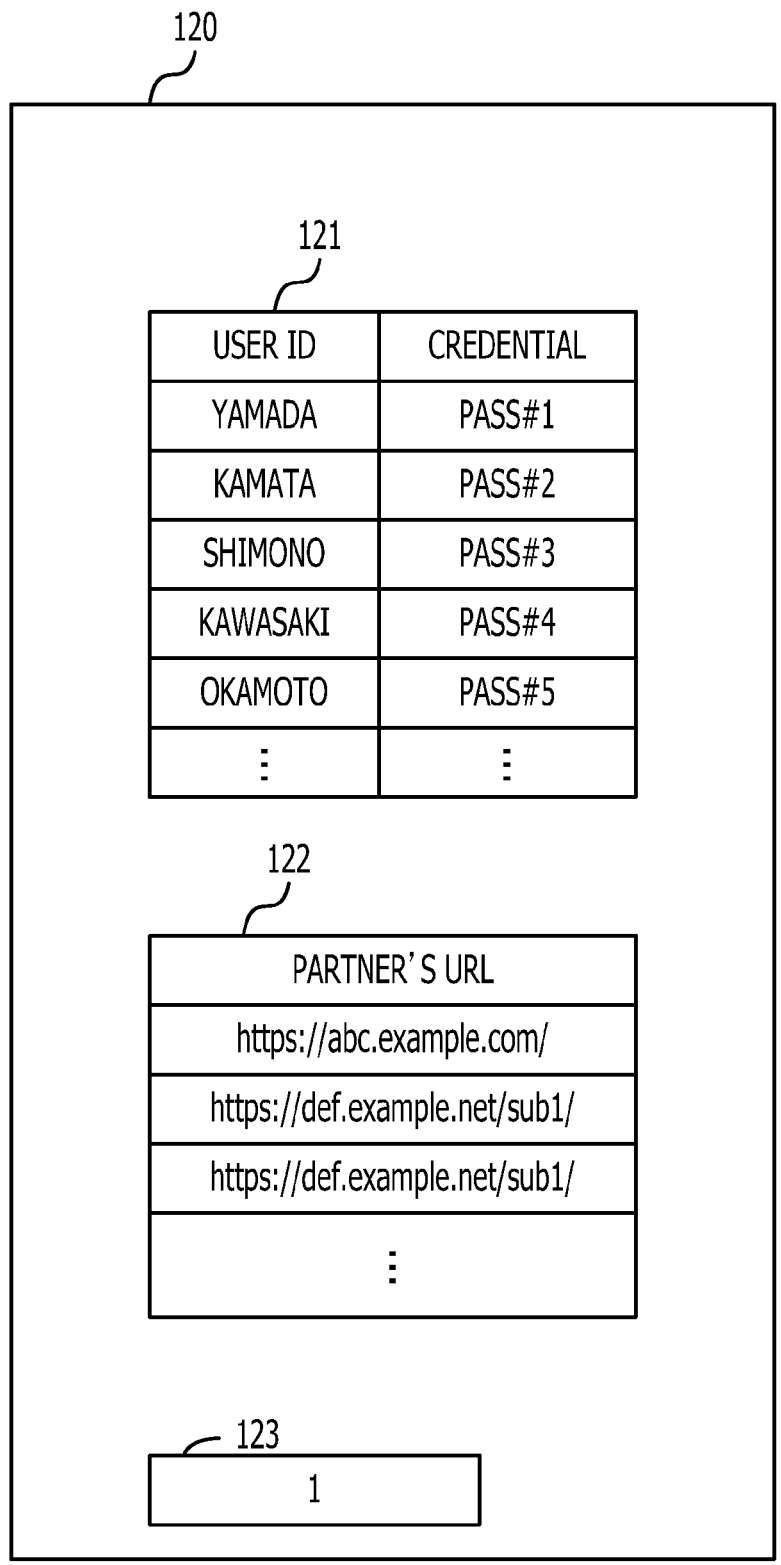
FIG. 7 is a diagram illustrating an example of storage information of a trusting relationship information storage unit.

The information stored in the trusting relationship information storage unit 120 will be described in detail. FIG. 7 is a diagram illustrating an example of the storage information of the trusting relationship information storage unit. The trusting relationship information storage unit 120 stores a user management table 121, a relationship definition table 122, and a chain threshold value 123.

The user management table 121 is a data table that manages the authentication information of the user having the account of the server 100. The user management table 121 includes columns for the user ID and the credential, respectively. In the column for the user ID, an identifier (user ID) that uniquely identifies a user is set. In the column for the credential, a credential such as a password of a user is set. The pair of the user ID and the credential is authentication information indicated with the user ID.

The relationship definition table 122 is a data table that manages the server of the company having the direct trusting relationship. The relationship definition table 122 has a column for a Uniform Resource Locator (URL) of the partner. In the column for the partner's URL, the URL that uniquely indicates the service provided by the server of the company having the direct trusting relationship with the company that manages the server 100 is set.

The chain threshold value 123 is a threshold value of the number of times of the chained-issuance of the token. When receiving the token issuance request added with the token issued by another server, the server 100 issues a token indicating the right to use the service thereof simply if the added number of times of the chained-issuance of the token is equal to or smaller than the chain threshold value 123.

Figure 8:
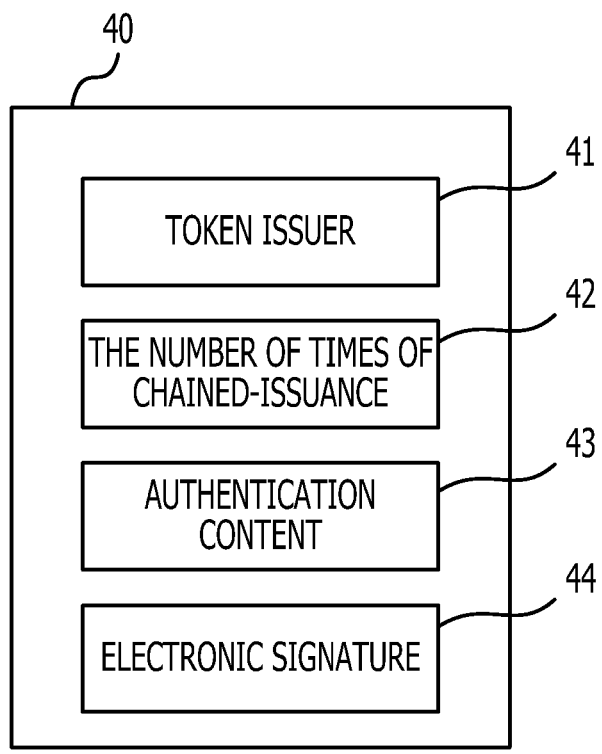
FIG. 8 is a diagram illustrating an example of information included in a token.

The content of the token used in the second embodiment will be described below. FIG. 8 is a diagram illustrating an example of information included in the token. A token 40 includes a token issuer 41, a number of times of chained-issuance 42, an authentication content 43, and an electronic signature 44.

The token issuer 41 is the identifier of the server that issues the token. For example, the URL of the server is used as the identifier of the server. The number of times of chained-issuance 42 is the number of times of the chained-issuance of the token based on the token issued by another server. For example, the initial value "0" as the number of times of the chained-issuance is set to the token issued by the server that performs the individual authentication of the user. In response to the token issuance request added with the token, the value obtained by counting up the original number of times of the chained-issuance of the token when the server issues a token indicating that the server has the right to use the service thereof, is set to the newly generated token.

The authentication content 43 is information that defines the content of the service provided to the user by the server that issues the identifier of the user as the token issuance receiver and issues the token. For example, the authentication content 43 may set the role of the user on the service provided by the server. In this case, for example, the server may limit the provision content of the service to the range according to the role that is set to the authentication content.

The electronic signature 44 is information added by the issuer of the token 40 to guarantee the correctness of the token 40. The electronic signature 44 is information that uniquely indicates a token issuer and detects falsification of the token if the token is falsified.

Figure 9:
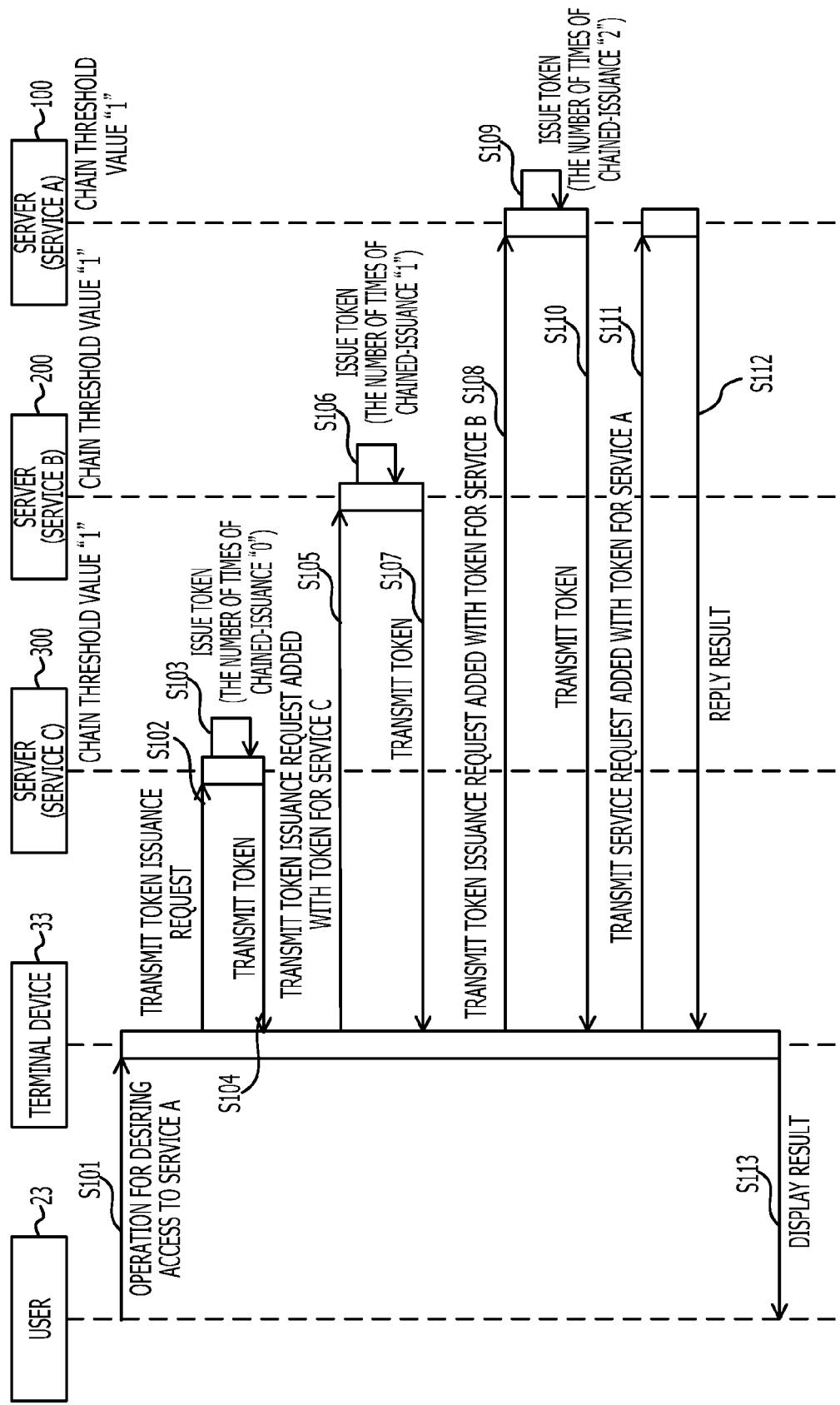
FIG. 9 is a diagram illustrating a first example of service providing processing by chained-issuing the token.

A service provision example obtained by chained-issuing the token will be described below. FIG. 9 is a sequence diagram illustrating a first example of service providing processing by chained-issuing the token. FIG. 9 illustrates an example of a case where the user 23 having the account of the server 300 uses the service provided by the server 100. According to the processing illustrated in FIG. 9, the user 23 uses the terminal device 33 to receive the user authentication from the server 300. The service provided by the service 100 is indicates as "service A," and the service provided by the server 200 is indicated as "service B," and the service provided by the server 300 is indicated as "service C." The chain threshold value "1" is set to the servers 100, 200, and 300. It is defined in the application 33a that there is an indirect relationship between the server 300 and the server 100 having the server 200 sandwiched therebetween.

[Operation S101] The user 23 operates the terminal device 33 and instructs the application 33a for processing that desires the access to the service A.

[Operation S102] In response to the operation of the user 23, the application 33a of the terminal device 33 transmits the token issuance request to the server 300.

[Operation S103] In the server 300, the access control unit 340 receives the token issuance request and then transfers the received token issuance request to the authentication unit 330. The authentication unit 330 issues the token (the token for the service C) indicating that the right to use the service C is included therein. The identifier of the server 300 is set to the issuer of the issued token, and the initial value "0" is set to the number of times of the chained-issuance.

[Operation S104] The authentication unit 330 of the server 300 transmits the token for the service C to the terminal device 33 through the access control unit 340.

[Operation S105] The application 33a of the terminal device 33 generates a token issuance request of the service B added with the token for the service C. The application 33a transmits the token issuance request of the service B to the server 200.

[Operation S106] The access control unit 240 of the server 200 receives the token issuance request and then transfers the received token issuance request to the authentication unit 230. The authentication unit 230 verifies the correctness of the token. If the number of times of the chained-issuance of the token for the service C added to the token issuance request is equal to or smaller than the chain threshold value of the server 200, the authentication unit 230 issues a token (a token for the service B) indicating the right to use the service B. In the example in FIG. 9, since the number of times of the chained-issuance of the token for the service C "0" is smaller than the chain threshold value "1" of the server 200, the token for the service B is issued. The identifier of the server 200 is set to the issuer of the issued token, and the value "1" obtained by adding one to the number of times of the chained-issuance of the token for the service C is set to the number of times of the chained-issuance.

[Operation S107] The authentication unit 230 of the service 200 transmits a token for the service B to the terminal device 33 through the access control unit 240.

[Operation S108] The application 33a of the terminal device 33 generates a token issuance request of the service A that is added with the token for the service B. The application 33a transmits the token issuance request of the service A to the server 100.

[Operation S109] The access control unit 140 of the server 100 receives the token issuance request and then transfers the received token issuance request to the authentication unit 130. The authentication unit 130 verifies the correctness of the token. If the number of times of the chained-issuance of the token for the service B added to the token issuance request is equal to or smaller then the chain threshold value in the server 100, the authentication unit 130 issues a token (a token for the service A) indicating the right to use the service A. In the example in FIG. 9, since the number of times of the chained-issuance of the token for the service B "1" is equal to or smaller than the chain threshold value of the server 200, the token for the service A is issued. The identifier of the server 100 is set to the issuer of the issued token, and the value "2" obtained by adding one to the number of times of the chained-issuance of the token for the service B is set to the number of times of the chained-issuance.

[Operation S110] The authentication unit 130 of the server 100 transmits the token for the service A to the terminal device 33 through the access control unit 140.

[Operation S111] The application 33a of the terminal device 33 generates the service request of the service A that is added with the token for the service A. The application 33a transits the service request of the service A to the server 100.

[Operation S112] The access control unit 140 of the service 100 accesses a DB 110 in response to the service request and then replies a processing result.

[Operation S113] When receiving the reply of the processing result from the server 100, the terminal device 33 displays the processing result on the monitor 11.

By chained-issuing the token as described above, the server 100 may provide the service A to the user 23 of the server 300 that does not have the direct relationship with the server 100. Even if the user 24 having the relationship with the server 100 that is more tenuous than the relationship with the server 300 tries to receive the provision of the service A from the server 100, the token issuance is rejected by the server 100. Below is an example of the case where the token issuance is rejected.

Figure 10:
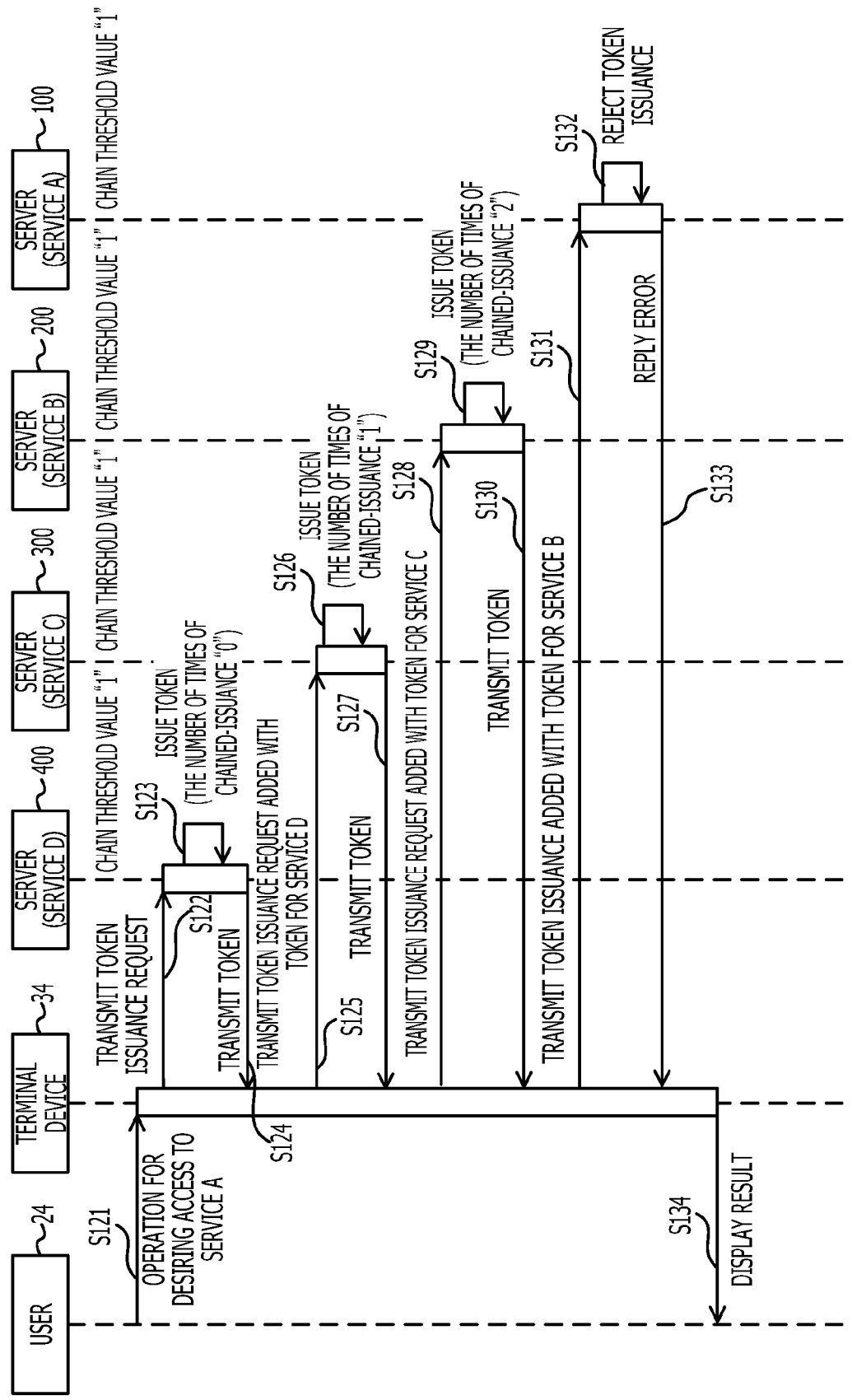
FIG. 10 is a sequence diagram illustrating a second example of the service providing processing by chained-issuing the tokens.

FIG. 10 is a sequence diagram illustrating a second example of the service providing processing for chained-issuing the token. FIG. 10 illustrates an example of the case where the user 24 having the account of the server 400 uses the service provided by the server 100. As for the processing illustrated in FIG. 10, the user 24 is assumed to receive the user authentication from the server 400 by using the terminal device 34. The service provided by the server 100 is indicated as "service A," the service provided by the server 200 is indicated as "service B," the service provided by the server 300 is indicated as "service C," and the service provided by the server 400 is indicated as "service D." The chain threshold value "1" is set to each of the servers 100, 200, 300, and 400. It is defined in the application 34a that the application 34a has an indirect relationship between the server 400 and the server 100 with the servers 200 and 300 therebetween.

[Operation S121] The user 24 operates the terminal device 34 and instructs the application 34a for the processing that desires the access to the service A.

[Operation S122] In response to the operation by the user 24, the application 34a of the terminal device 34 transmits the token issuance request to the server 400.

[Operation S123] In the server 400, the access control unit 440 receives the token issuance request and then transfers the received token issuance request to the authentication unit 430. The authentication unit 430 issues the token (the token for the service D) indicating the right to use the service D. The identifier of the server 400 is set to the issuer of the issued token, and the initial value "0" is set to the number of times of the chained-issuance.

[Operation S124] The authentication unit 430 of the server 400 transmits the token for the service D to the terminal device 34 through the access control unit 440.

[Operation S125] The application 34a of the terminal device 34 generates the token issuance request of the service C that is added with the token for the service D. The application 34a transmits the token issuance request of the service C to the server 300.

[Operation S126] The access control unit 340 of the server 300 receives the token issuance request and then transfers the received token issuance request to the authentication unit 330. The authentication unit 330 verifies the correctness of the token. If the number of times of the chained-issuance of the token for the service D, which is added to the token issuance request, is equal to or smaller than the chain threshold value in the server 300, the authentication unit 330 issues a token (a token for the service C) indicating the right to use the service C. In the example in FIG. 10, the number of times of the chained-issuance of the token for the service C "0" is smaller than the chain threshold value "1" of the server 300. Therefore, the token for the service C is issued. The identifier of the server 300 is set to the issuer of the issued token. The value "1" obtained by adding one to the number of times of the chained-issuance of the token for the service D is set to the number of times of the chained-issuance.

[Operation S127] The authentication unit 330 of the server 300 transmits the token for the service C to the terminal device 34 through the access control unit 340.

[Operation S128] The application 34a of the terminal device 34 generates the token issuance request of the service B that is added with the token for the service C. The application 34a transmits the token issuance request of the service B to the server 200.

[Operation S129] The access control unit 240 of the server 200 receives the token issuance request and then transfers the received token issuance request to the authentication unit 230. The authentication unit 230 verifies the correctness of the token. If the number of times of the chained-issuance of the token for the service C, which is added to the token issuance request, is equal to or smaller than the chain threshold value in the server 200, the authentication unit 230 issues the token (the token for the service B) indicating the right to use the service B. In the example in FIG. 10, the number of times of the chained-issuance of the token for the service C is equal to or smaller than the chain threshold value "1" of the server 200. Therefore, the token for the service B is issued. The identifier of the server 200 is set to the issuer of the issued token. The value "2" obtained by adding one to the number of times of the chained-issuance of the token for the service C is set to the number of times of the chained-issuance.

[Operation S130] The authentication unit 230 of the server 200 transmits the token for the service B to the terminal device 34 through the access control unit 240.

[Operation S131] The application 34a of the terminal device 34 generates the token issuance request of the service A that is added with the token for the service B. The application 34a transmits the token issuance request of the service A to the server 100.

[Operation S132] The access control unit 140 of the server 100 receives the token issuance request and then transfers the received token issuance request to the authentication unit 130. The authentication unit 130 verifies the correctness of the token. If the number of times of the chained-issuance of the token for the service B, which is added to the token issuance request, is equal to or smaller than the chain threshold value of the server 100, the authentication unit 130 issues the token (the token for the service A) indicating the right to use the service A. On the other hand, if the number of times of the chained-issuance of the token for the service B is larger than the chain threshold value of the server 100, the authentication unit 130 rejects the token issuance. In the example in FIG. 10, the number of times of the chained-issuance of the token for the service B "2" is larger than the chain threshold value "1" of the server 100, the token issuance for the service A is rejected.

[Operation S133] The authentication unit 130 of the server 100 transmits an error reply to the terminal device 34 through the access control unit 140.

[Operation S134] When receiving the error reply from the server 100, the terminal device 34 displays the processing result indicating end with error.

As illustrated in FIGS. 9 and 10, the server 100 issues the token for the service A to the user 23 who receives the user authentication in the server 300. However, the server 100 does not issue the token to the user 24 who receives the user authentication in the server 400. Due to the chained-issuance of the token, the provision of service to the user authenticated by another server is permitted, and the range of the users who may use the service may be appropriately limited.

Below is a procedure, performed by the server according to the token issuance request added with the token issued by the server 200, of the token issuing processing based on the relationship with another server.

Figure 11:
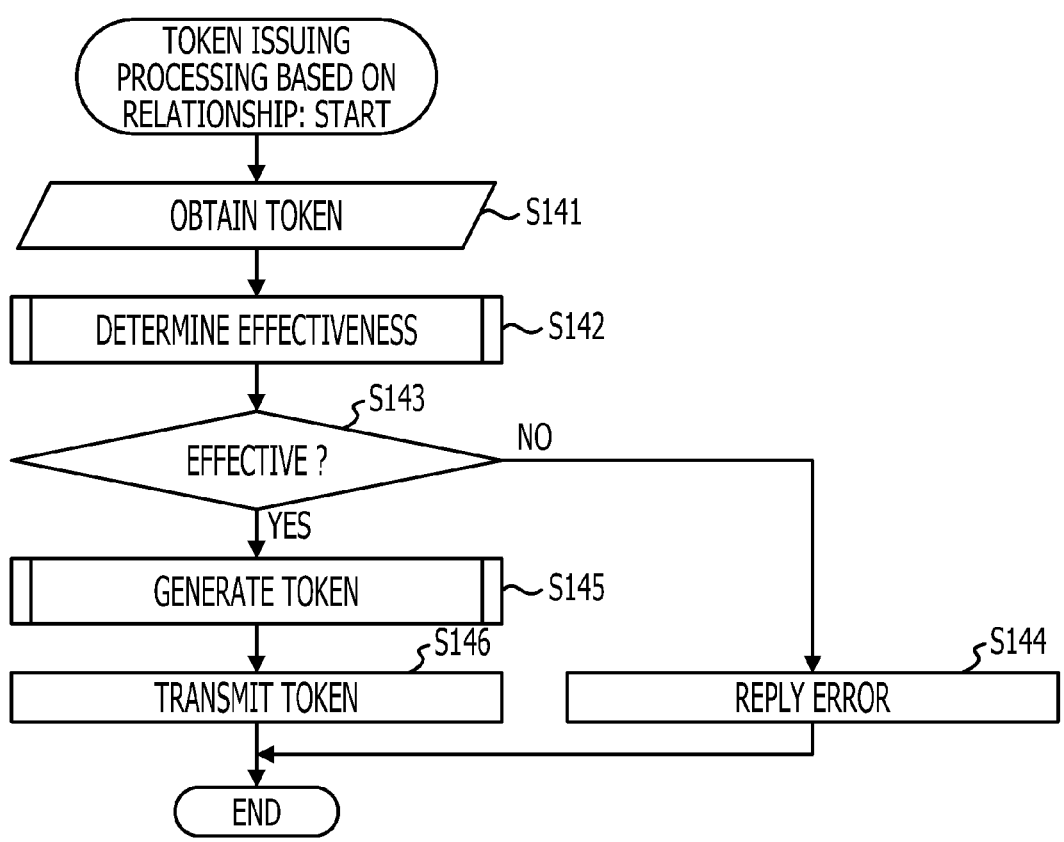
FIG. 11 is a flowchart illustrating an example of token issuing processing based on a relationship.

FIG. 11 is a flowchart illustrating an example of the procedure of the token issuing processing based on the relationship. The processing illustrated in FIG. 11 will be described according to the order of the operation numbers. [Operation S141] The authentication unit 130 obtains the token issued by the server 200.

[Operation S142] The authentication unit 130 determines the effectiveness of the obtained token. The details of the processing will be described below (see FIG. 12).

[Operation S143] If the token is effective, the authentication unit 130 proceeds the processing to Operation S145. If the token is ineffective, the authentication unit 130 proceeds the processing to Operation S144.

[Operation S144] The authentication unit 130 transmits the error reply to the terminal device 32 and ends the processing.
[Operation S145] The authentication unit 130 generates a token. The details of the processing will be described below (see FIG. 13).

[Operation S146] The authentication unit 130 transmits the token generated in Operation S145 to the terminal device as a transmitting source of the token issuance request. The details of the effectiveness determining processing will be described below.

Figure 12:
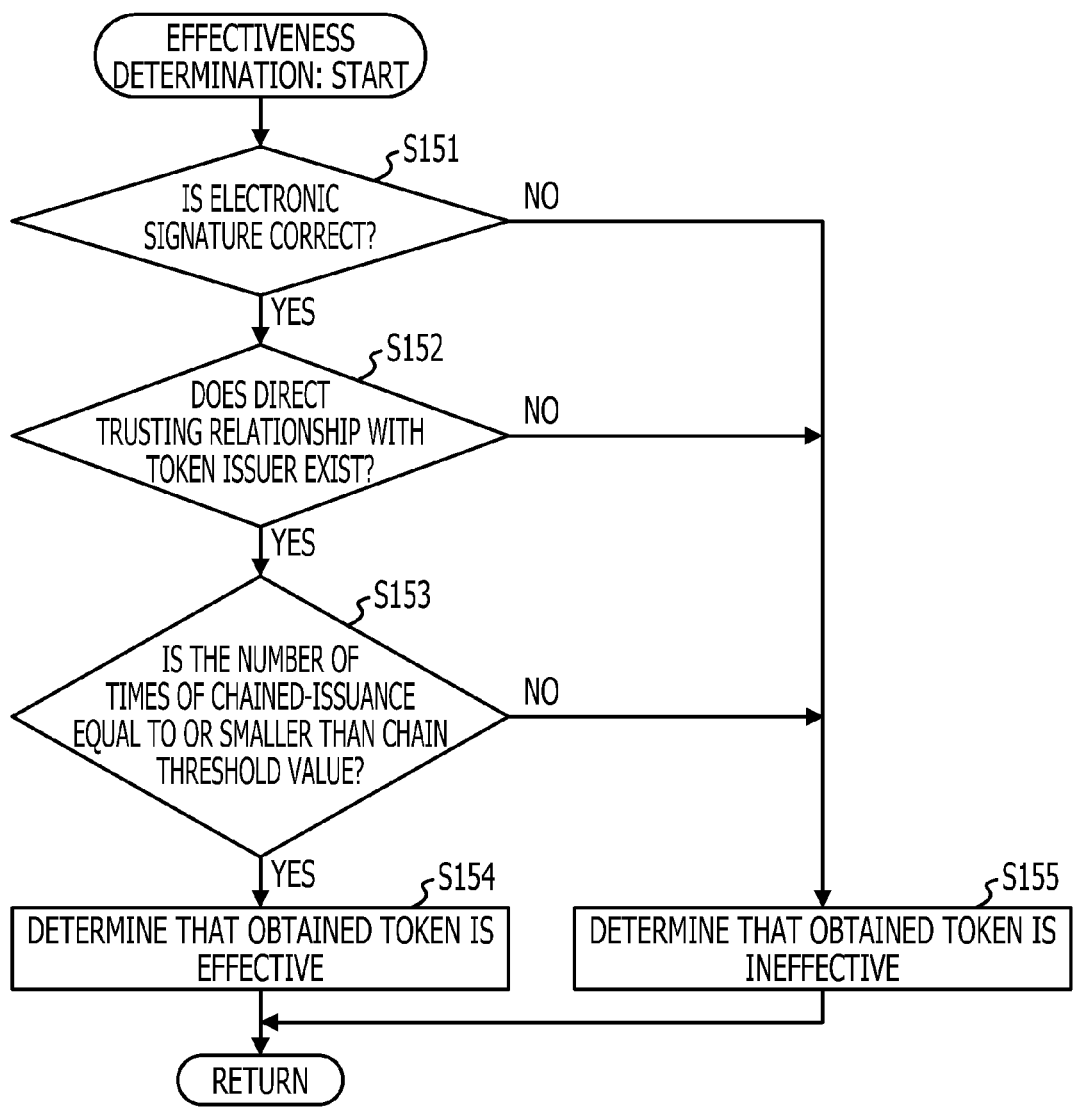
FIG. 12 is a flowchart illustrating an example of a procedure of effectiveness determining processing.

FIG. 12 is a flowchart illustrating an example of a procedure of the effectiveness determining processing. The processing illustrated in FIG. 12 will be described according to the order of the operation numbers.

[Operation S151] The authentication unit 130 determines whether the electronic signature of the obtained token is correct. For example, the authentication unit 130 determines that the electronic signature is correct if the electronic signature is restored into the correct content by the public key of the server 200. If the electronic signature is correct, the authentication unit 103 proceeds the processing to Operation S152. If the electronic signature is not correct, the authentication unit 130 proceeds the processing to Operation S155.

[Operation S152] The authentication unit 130 determines whether there is a direct trusting relationship with the issuer of the obtained token. For example, according to the value of the issuer of the token, the authentication unit 130 searches the column for the URL of the partner of the relationship definition table 122. If the URL is detected, the authentication unit 130 determines that the direct trusting relationship with the issuer of the token exists. If the direct trusting relationship with the issuer of the token exists, the authentication unit 130 proceeds the processing to Operation S153. If the direct trusting relationship with the issuer of the token does not exist, the authentication unit 130 proceeds the processing to Operation S155.

[Operation S153] The authentication unit 130 determines whether the number of times of the chained-issuance of the obtained token is equal to or smaller than the value of the chain threshold value 123 of the trusting relationship information storage unit 120 of the server 100. If the number of times of the chained-issuance is equal to or smaller than the chain threshold value, the authentication unit 130 proceeds the processing to Operation S154. If the number of times of the chained-issuance is larger than the chain threshold value, the authentication unit 130 proceeds the processing to Operation S155.

[Operation S154] If the number of times of the chained-issuance is equal to or smaller than the chain threshold value, the authentication unit 130 determines that the obtained token is effective and ends the effectiveness determining processing.

[Operation S155] If the electronic signature is incorrect, if the direct trusting relationship with the issuer of the token exists, or if the number of times of the chained-issuance is larger than the chain threshold value, the authentication unit 130 determines that the obtained token is ineffective and ends the effectiveness determining processing. That is, if the electronic signature is not correct, if the direct trusting relationship with the issuer of the token does not exist, or if the number of times of the chained-issuance is larger than the chain threshold value, the token issuance is suppressed.

Figure 13:
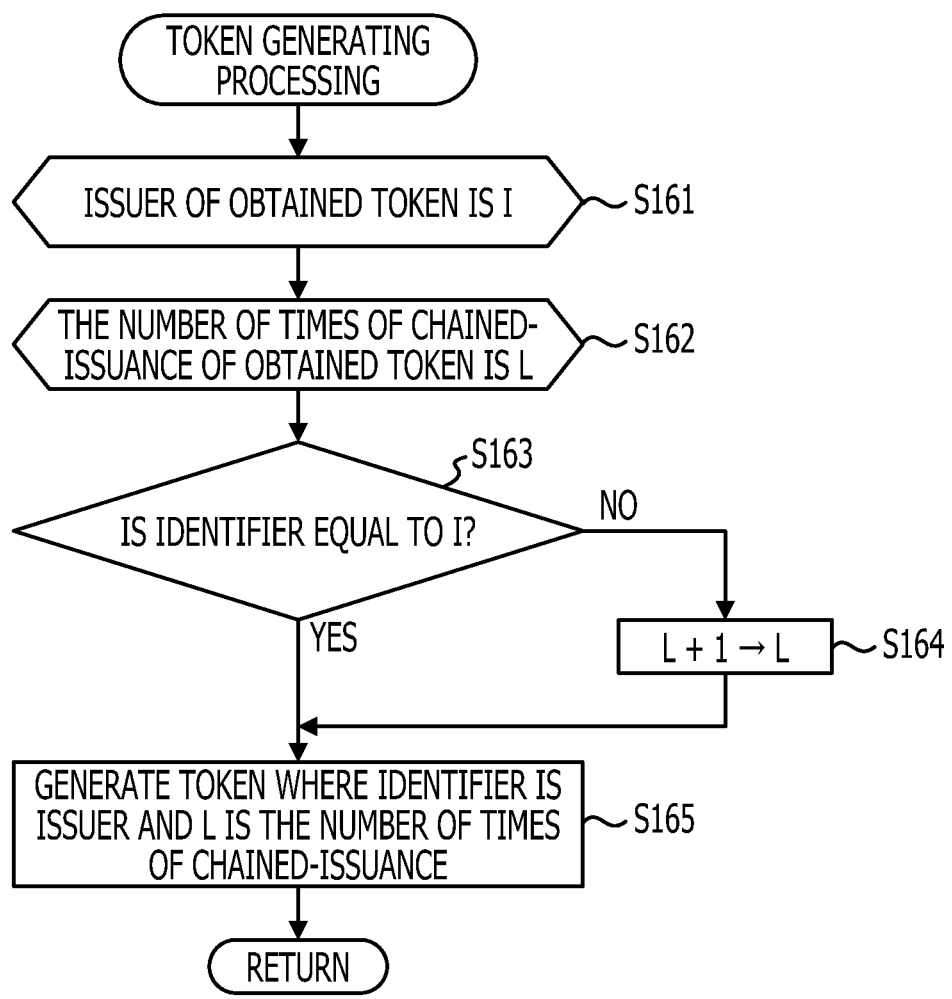
FIG. 13 is a flowchart illustrating an example of a procedure of token generating processing.

In this manner, the effectiveness of the token issued by another server is determined. The details of the token generating processing will be described below. FIG. 13 is a flowchart illustrating an example of a procedure of the token generating processing. The processing illustrated in FIG. 17 will be described according to the order of the operation numbers.

[Operation S161] The authentication unit 130 has I as the issuer of the obtained token.

[Operation S162] The authentication unit 130 has L as the number of times of the chained-issuance of the obtained token.

[Operation S163] The authentication unit 130 determines whether the identifier (the URL and the like) of the server 100 is equal to I. If yes, the authentication unit 130 proceeds the processing to Operation S165. If no, the authentication unit 130 proceeds the processing to Operation S164.

[Operation S164] The authentication unit 130 adds one to the value of L to obtain a new L.

[Operation S165] The authentication unit 130 generates a token where the identifier thereof is the issuer and L is the number of times of the chained-issuance.

Figure 14:
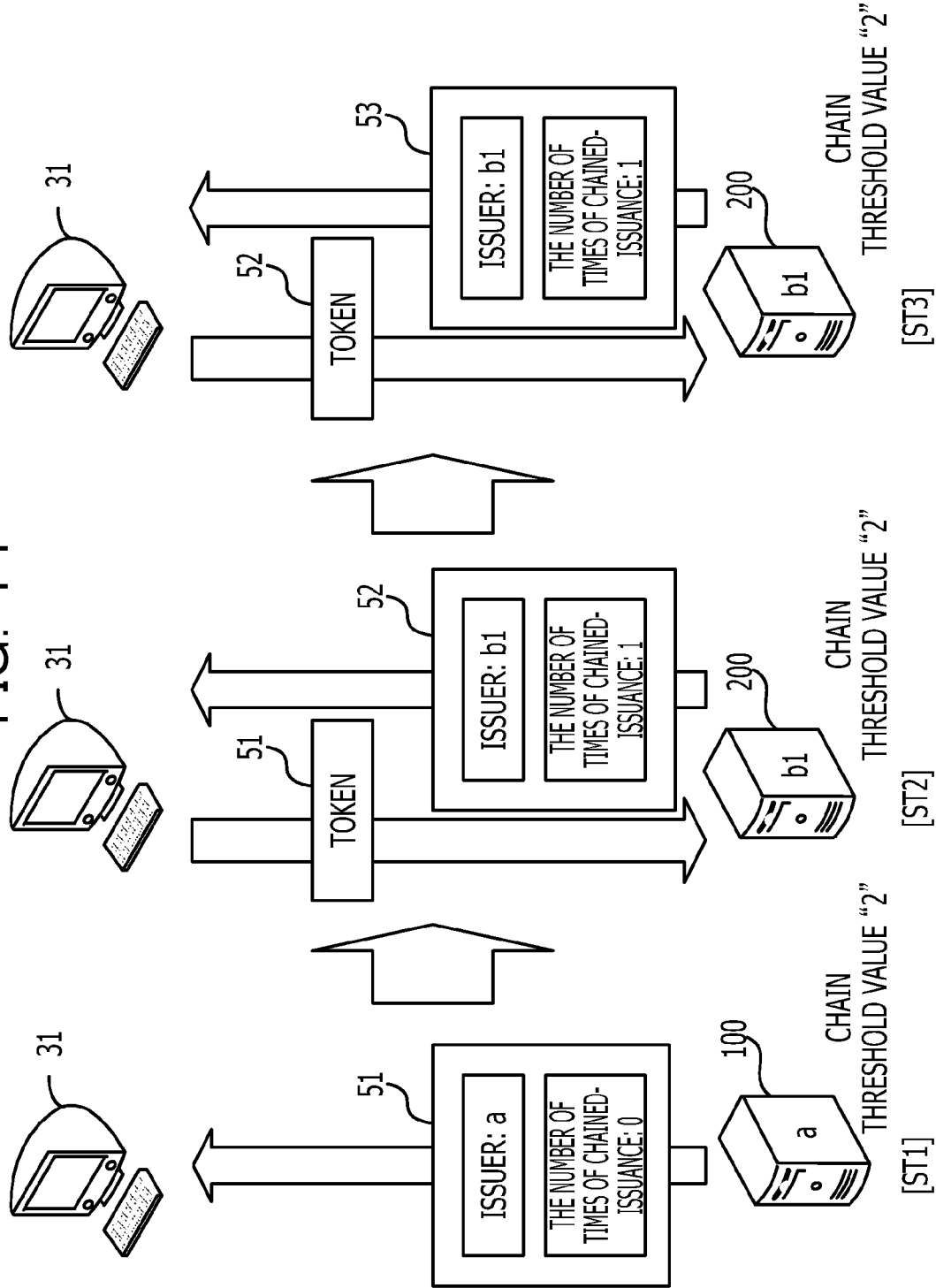
FIG. 14 is a first diagram illustrating a transition example of the issued tokens.
Figure 15:
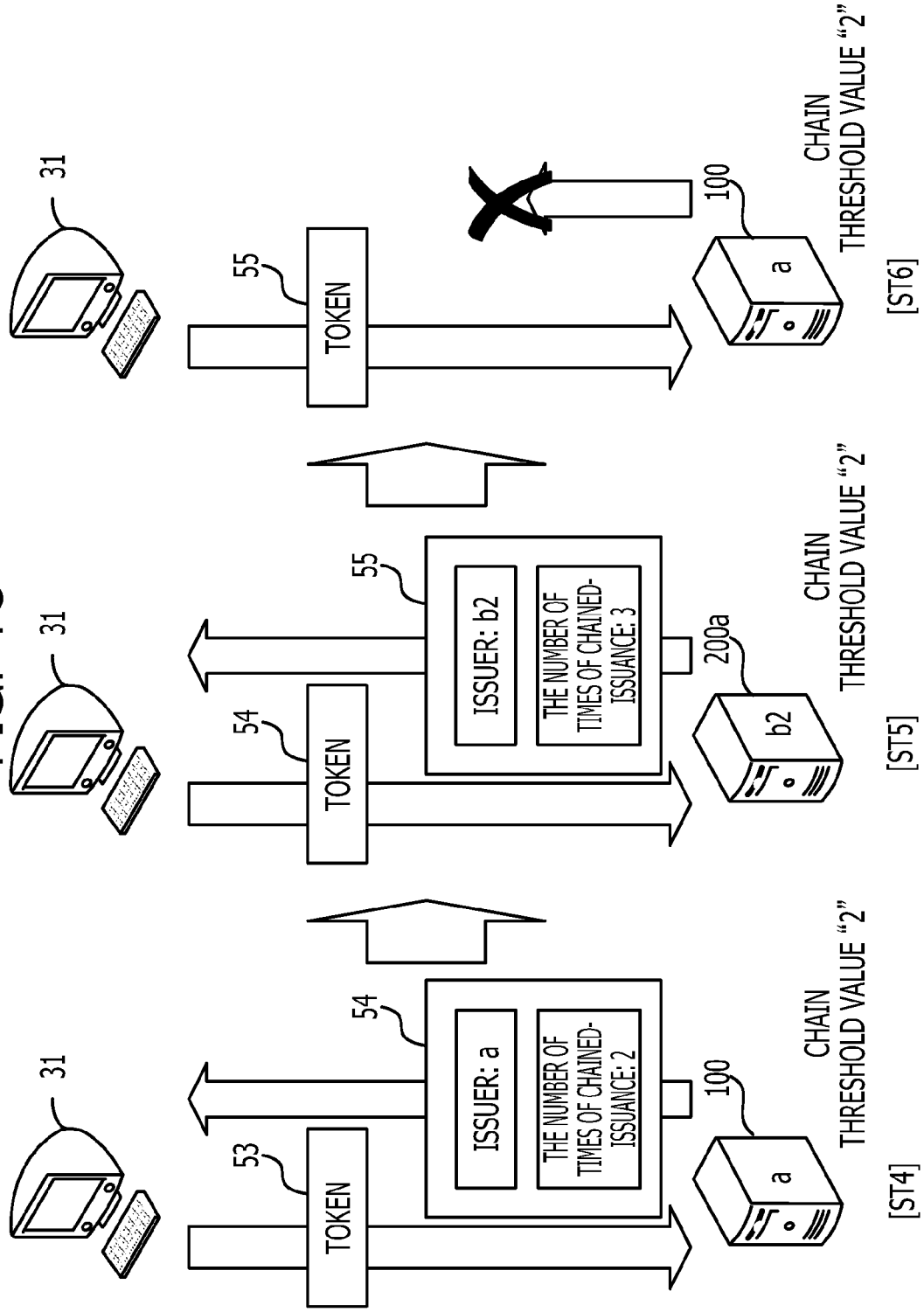
FIG. 15 is a second diagram illustrating the transition example of the issued tokens.

If the obtained token is issued by another server in this manner, the new token obtained by counting up the number of times of the chained-issuance is generated. With reference to FIGS. 14 and 15, a transition example of the issued token will be described below. In the examples in FIGS. 14 and 15, the chain threshold value set to each of the servers is "2." The token issuance request from the terminal device 31 is transmitted from in an order the server 100, the server 200 (first time), the server 200 (second time), the server 100, the server 200a, and the server 100.

FIG. 14 is a first diagram illustrating a transition example of the issued token. In a first state (ST1), in response to the token issuance request from the terminal device 31, a token 51 is issued from the server 100. An identifier "a" of the server 100 is set to the issuer of the token 51, and the initial value "0" is set to the number of times of the chained-issuance.

In a second state (ST2), the terminal device 31 transmits the token issuance request added with the token 51 to the sever 200. In this case, the server 200 confirms that the issuer of the token 51 is the server 100 and that the number of times of the chained-issuance is equal to or smaller than the chain threshold value thereof, and then the server 200 issues a token 52. An identifier "b1" of the server 200 is set to the issuer of the token 52, and "1" is set to the number of times of the chained-issuance.

In a third state (ST3), the terminal device 31 transmits the token issuance request added with the token 52 to the server 200. In this case, the server 200 confirms that the issuer of the token 52 is the server 200 and that the number of times of the chained-issuance is equal to or smaller than the chain threshold value thereof, and then the server 200 issues a token 53. The identifier "b1" of the server 100 is set to the issuer of the token 53, and "1" is set to the number of times of the chained-issuance.

FIG. 15 is a second diagram illustrating a transition example of the issued token. In a fourth state (ST4), the terminal device 31 transmits the token issuance request added with the token 53 to the server 100. In this case, the server 100 confirms that the issuer of the token 53 is the server 200 and that the number of times of the chained-issuance is equal to or smaller than the chain threshold value thereof, and then the server 100 issues a token 54. The identifier "a" of the server 100 is set to the issuer of the token 54, and "2" is set to the number of times of the chained-issuance.

In a fifth state (ST5), the terminal device 31 transmits the token issuance request added with the token 54 to the server 200a. In this case, the server 200a confirms that the issuer of the token 54 is the server 100 and that the number of times of the chained-issuance is equal to or smaller than the chain threshold value thereof, and then the server 200a issues a token 55. An identifier "b2" of the server 200a is set to the issuer of the token 55, and "3" is set to the number of times of the chained-issuance.

In a sixth state (ST6), the terminal device 31 transmits the token issuance request added with the token 55 to the server 100. In this case, the server 100 confirms that the issuer of the token 55 is the server 200a and that the number of times of the chained-issuance is larger than the chain threshold value thereof, and then the server 100 rejects the token issuance.

Since each of the servers chained-issues the token based on the token issued by the server with the direct trusting relationship, the user is able to obtain the token from a plurality of servers by receiving the user authentication in a single server. Since each token indicates the right to use the service provided by the server that issues the token, the user is able to receive the provision of service from the plurality of servers. According to the second embodiment, if the number of times of the chained-issuance is larger than the threshold value, the new token is not issued. This prevents the range in which each user may use the service from expanding with no limitation.

According to the second embodiment, if the issuing source of the token added with the token issuance request is the server 200, the server 200 issues the token of which the number of times of the chained-issuance is unchanged. However, the token issuance may be suppressed. For example, as for the example in FIG. 14, in the third state (ST3), the server 200 is the issuing source of the obtained token 52, so that the server 200 does not issue the token 53. In this case, by transmitting the token issuance request added with the token 52 transmitted to the server 200 to another server such as the server 100, the terminal device 31 may chained-obtain the token from the other server.

A third embodiment will be described below. According to the third embodiment, instead of the number of times of the chained-issuance according to the second embodiment, the identifier of the token issuer is set to the token as an issuance history.

For example, based on the token obtained from the server 100, the user having the account of the server 100 may obtain the token from the server 200. Based on the token issued by the server 200, the user may obtain the token from the server 100. In this case, according to the second embodiment, the server 100 issues the new token and counts up the number of times of the chained-issuance added to the token. The number of times of the chained-issuance of the token is counted up even though the user has the account of the server 100. Due to this, the range of the server in which the user may receive the service by using the token is narrowed.

According to the third embodiment, the issuance history instead of the number of times of the chained-issuance is set to the token. In the issuance history of the token, for example, before issuing the token, the identifier of the server that performed the token issuance with a chain relationship with the token is set. Therefore, by counting the number of entries of the issuance history, the number of times of the chained-issuance may be recognized. To issue another token based on the token to which the identifier thereof is set in the issuance history, each of the servers deletes the entry following the identifier thereof in the issuance history. Therefore, in the procedure in which the chained-issuance of the token is performed, at a time of token issuance for the second time and following in the same server, the number of times of token issuance (the entry number of the issuance history) is put back to the value of the time of the token issuance for the first time in the server. As a result, each of the users may obtain the token as many times as possible from the server from which the user authentication is received and the server having a relationship with the server within a prescribed range.

The system configuration of the third embodiment is substantially the same as the configuration of the second embodiment illustrated in FIGS. 3 to 7. With reference to the numerals of the elements illustrated in FIGS. 3 to 7, the third embodiment will be described below.

Figure 16:
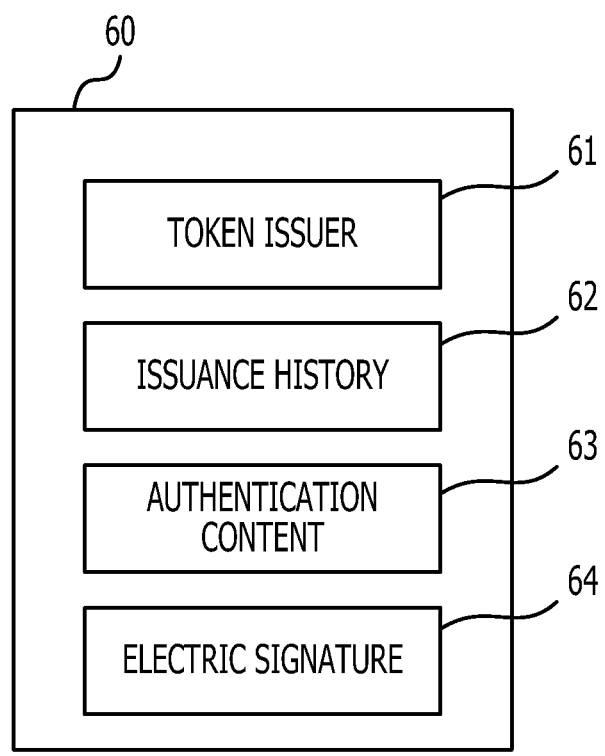
FIG. 16 is a diagram illustrating an example of information included in the token according to a third embodiment.

FIG. 16 is a diagram illustrating an example of information included in the token according to the third embodiment. The token 60 includes a token issuer 61, an issuance history 62, an authentication content 63, and an electronic signature 64. The token issuer 61, the authentication content 63, and the electronic signature 64 are substantially the same as the elements with the similar names included in the token 40 according to the second embodiment illustrated in FIG. 8.

The issuance history 62 is a list of identifiers of the servers that perform the chained-issuance of the token in a process in which the server that performs the user authentication and then issues the token 60. The number of the servers registered in the issuance history 62 is used as the number of times of the chained-issuance of the token 60.

Figure 17:
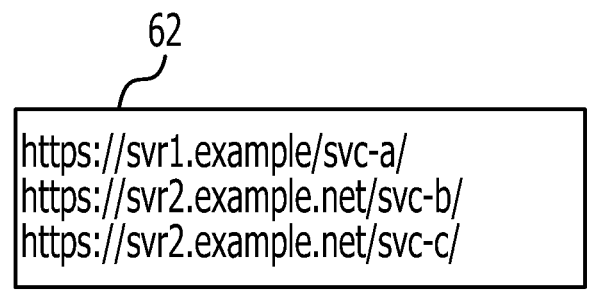
FIG. 17 is a diagram illustrating an example of an issuance history.

FIG. 17 is a diagram illustrating an example of the issuance history. In the example in FIG. 17, the identifier of the server that performed the user authentication and the identifier of each server that chained-issued the tokens from the token issued by the server are set to the issuance history 62. The identifier of the server is, for example, the URL of the server.

Figure 18:
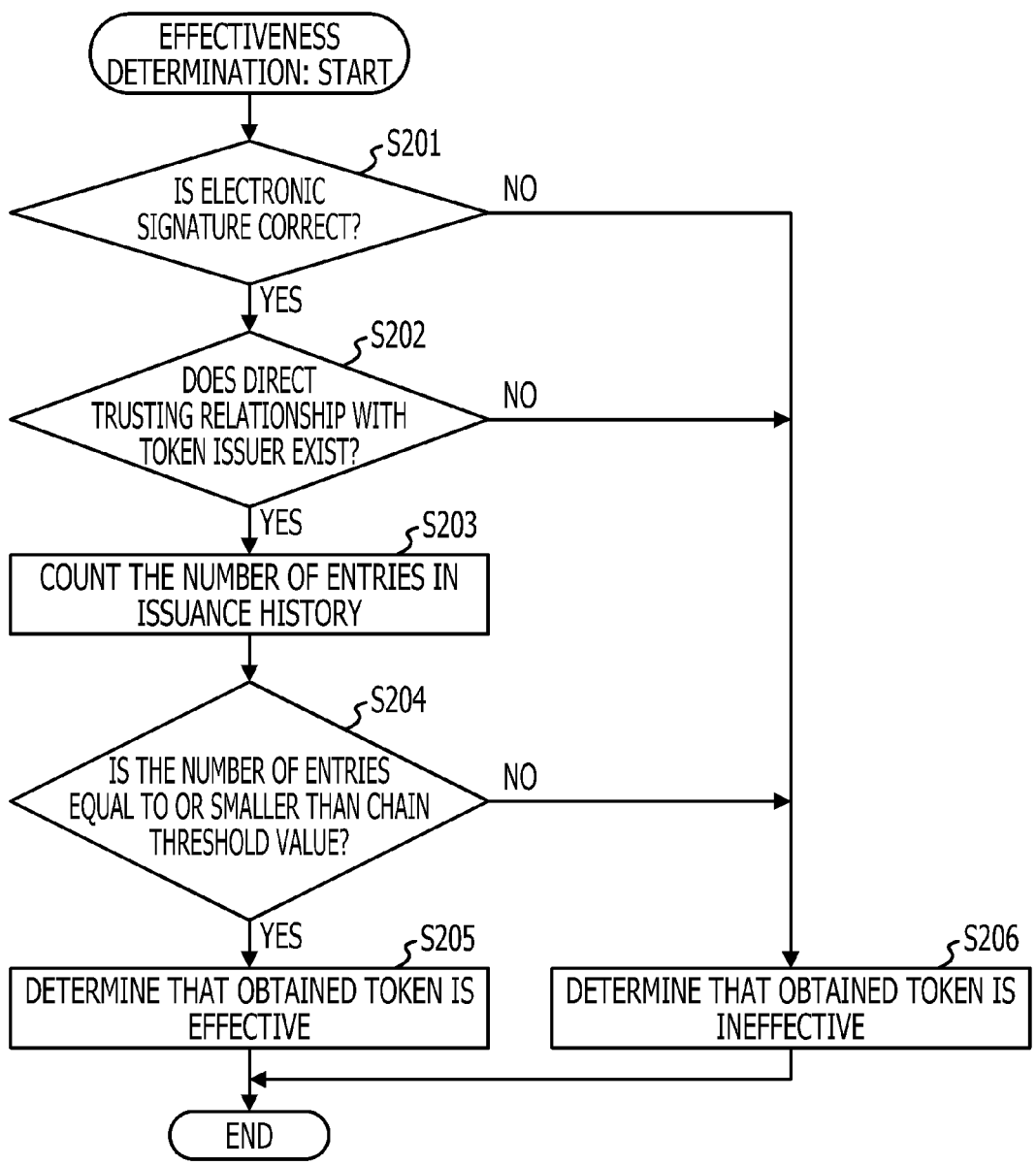
FIG. 18 is a flowchart illustrating an example of a procedure of the effectiveness determining processing according to the third embodiment.

The effectiveness determining processing and the token generating processing according to the third embodiment are different from the processing according to the second embodiment. FIG. 18 is a flowchart illustrating an example of a procedure of the effectiveness determining processing according to the third embodiment. The processing of Operations S201, S202, S205, and S206 illustrated in FIG. 18 are substantially the same as the processing of Operations S151, S152, S154, and S155 according to the second embodiment illustrated in FIG. 12. In Operations S203 and S204 that are different from the operations according to the second embodiment, the following processing is performed.

[Operation S203] The authentication unit 130 counts the number of entries in the issuance history of the obtained token. The counted value indicates the number of times of the chained-issuance of the token until the obtained token is issued.

[Operation S204] The authentication unit 130 determines whether the number of entries in the issuance history is equal to or smaller than the chain threshold value of the server 100. If the number of entries is equal to or smaller than the chain threshold value, the authentication unit 130 proceeds the processing to Operation S205 and determines that the obtained token is effective. If the number of entries is larger than the chain threshold value, the authentication unit 130 proceeds the processing to Operation S206 and determines that the obtained token is ineffective.

As described above, by counting the number of entries in the issuance history, the number of times of the chained-issuance of the token until the issuance of the obtained token is calculated. By comparing the calculated number of times of the chained-issuance to the chain threshold value, the effectiveness of the obtained token is determined.

Figure 19:
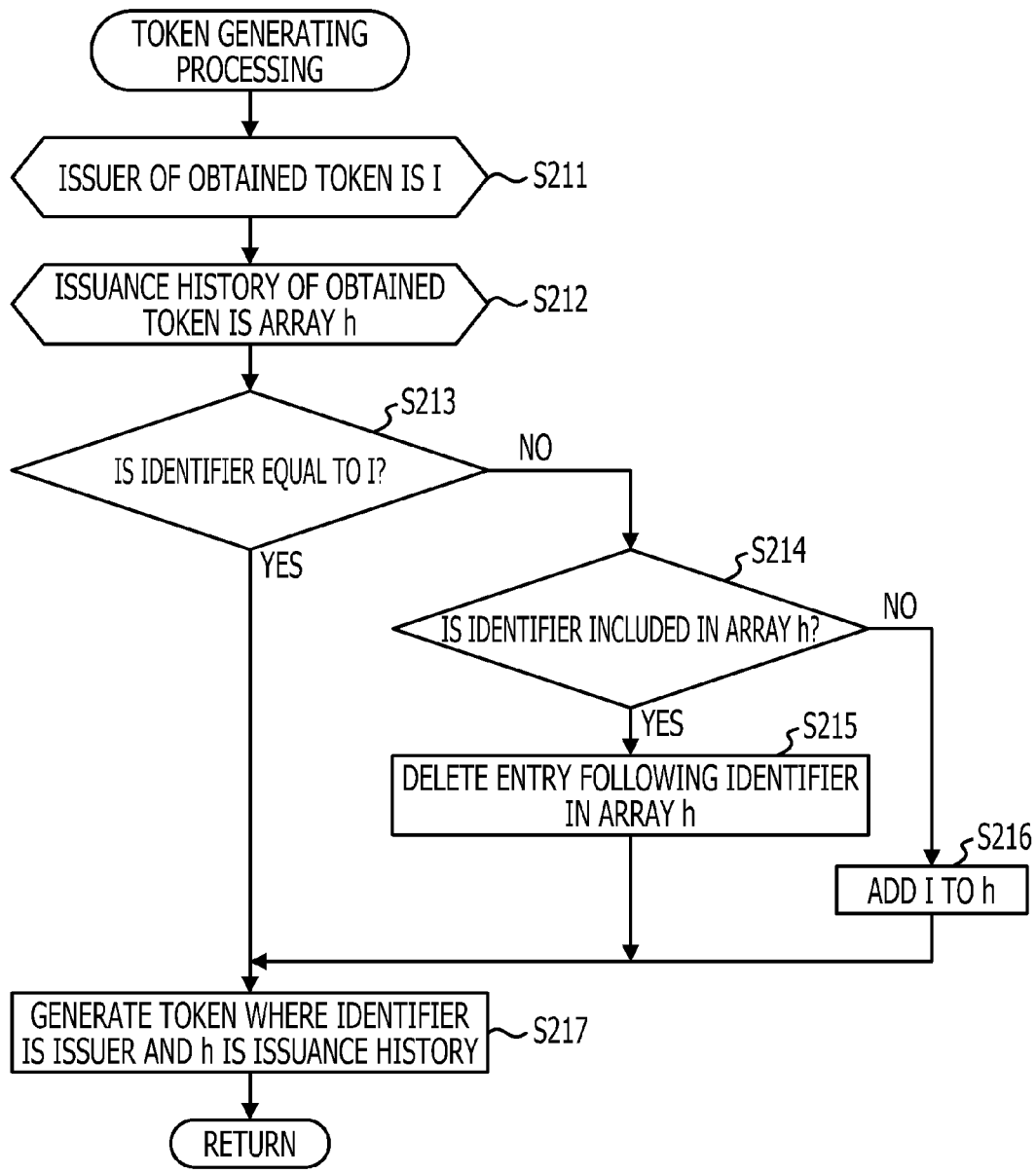
FIG. 19 is a flowchart illustrating an example of a procedure of the token generating processing according to the third embodiment.

FIG. 19 is a flowchart illustrating an example of a procedure of the token generating processing according to the third embodiment. The processing illustrated in FIG. 19 will be described according to the order of the operation numbers.

[Operation S211] The authentication unit 130 has I as the issuer of the obtained token.

[Operation S212] The authentication unit 130 defines an array h with entries of the issuance history of the obtained token as elements. In the array h, the identifier of the server that issued the tokens is set in an order of the registration.

[Operation S213] The authentication unit 130 determines whether the identifier (the URL and the like) of the server 100 is equal to I. If yes, the authentication unit 130 proceeds the processing to Operation S217. If no, the authentication unit 130 proceeds the processing to Operation S214.

[Operation S214] The authentication unit 130 determines whether the identifier of the server 100 is included in the array h. If yes, the authentication unit 130 proceeds the processing to Operation S215. If no, the authentication unit 130 proceeds the processing to Operation S216.

[Operation S215] The authentication unit 130 deletes the entry following the entry to which the identifier of the server 100 in the array h is set. At this time, the entry to which the identifier of the server 100 is set is deleted as well. After that, the authentication unit 130 proceeds the processing to Operation S217.

[Operation S216] The authentication unit 130 adds I as an entry to the array h.

[Operation S217] The authentication unit 130 generates a token where the identifier of the server 100 is the issuer and the array h is the issuance history.

In this manner, the identifier of the server that issued the obtained token is added to the issuance history of the new token that is issued based on the obtained token. If the issuance history of the obtained token includes the identifier of the server 100, the entry following the identifier is deleted.

Figure 20:
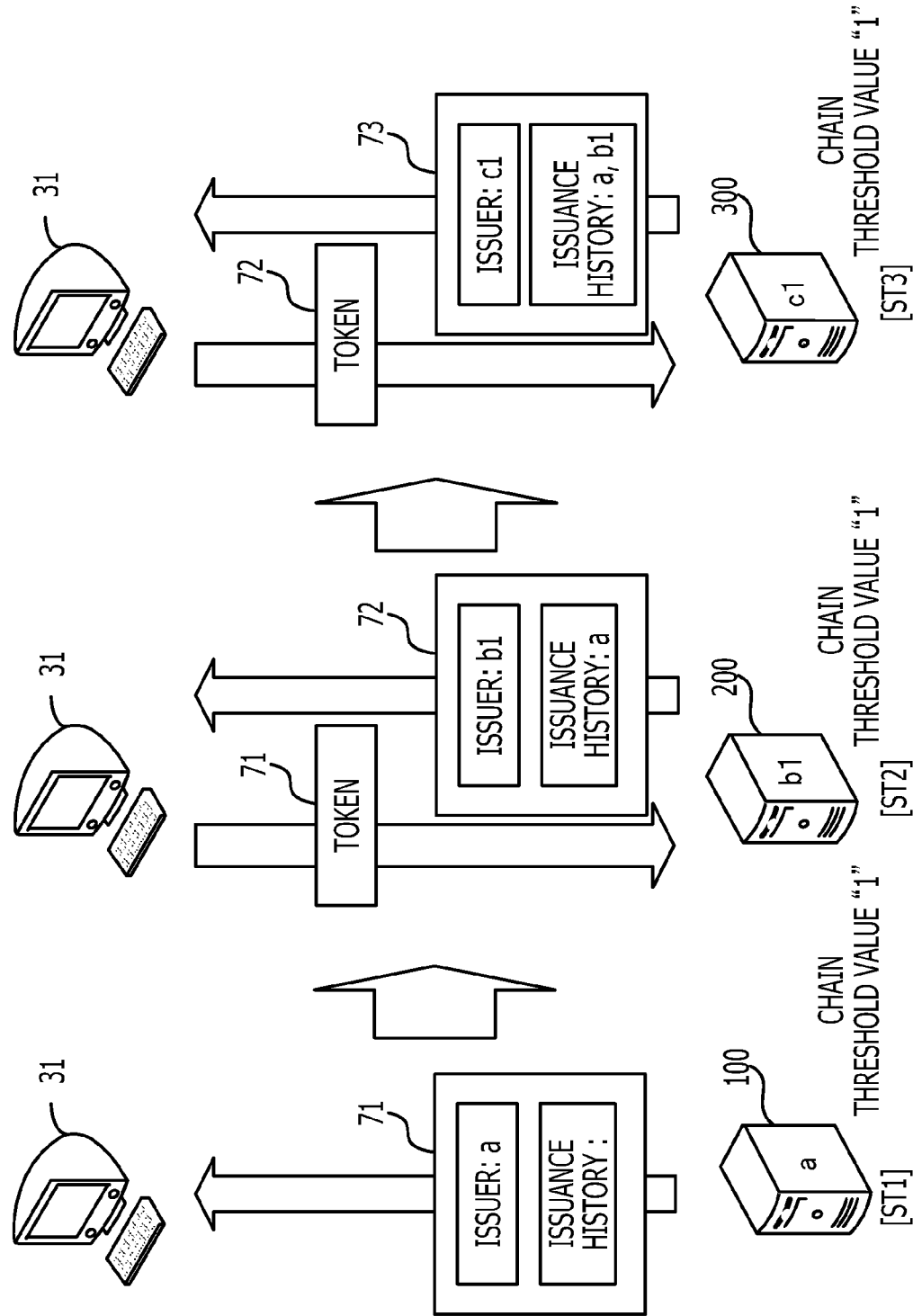
FIG. 20 is a first diagram illustrating a transition example of the issued token according to the third embodiment.
Figure 21:
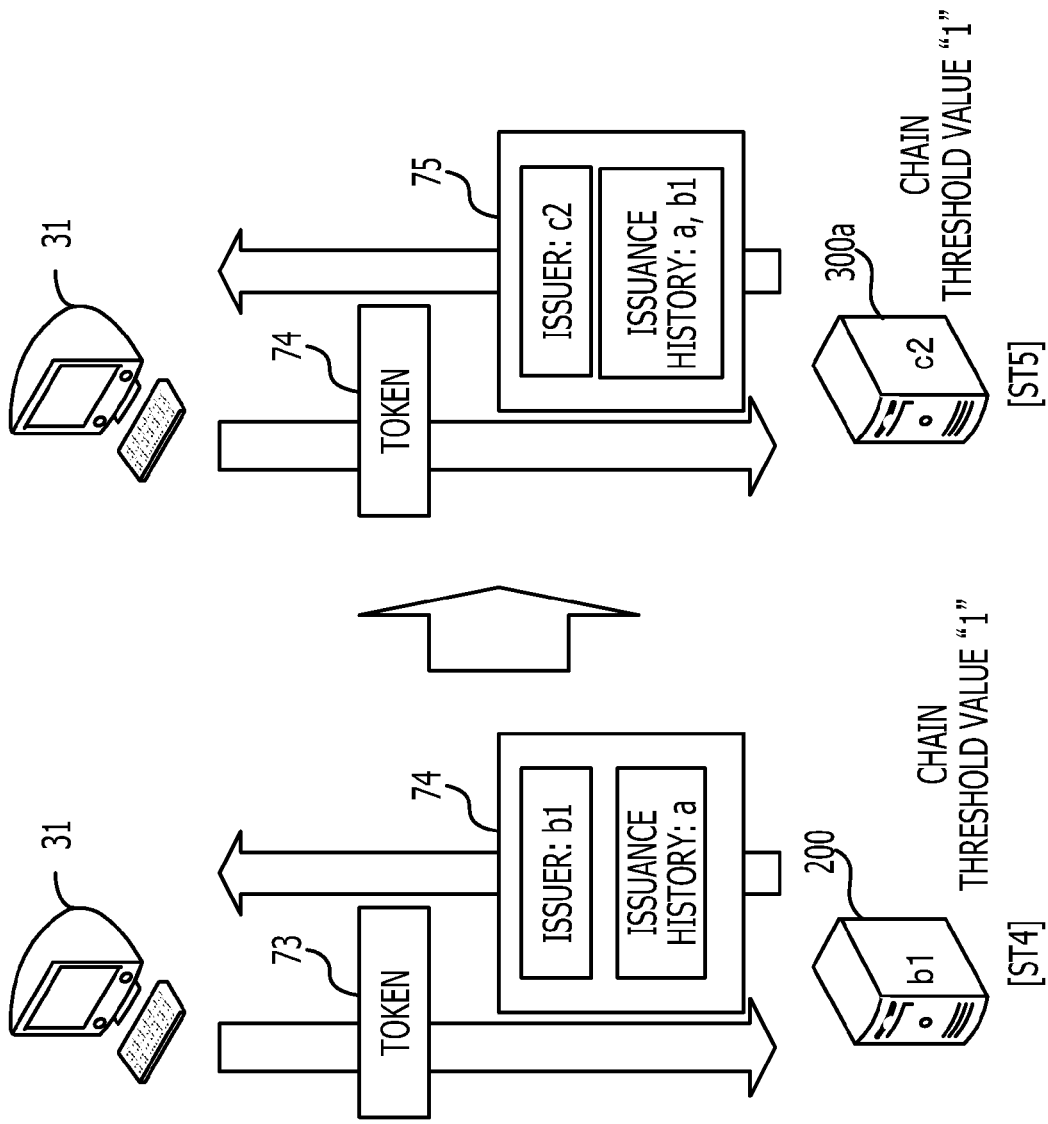
FIG. 21 is a second diagram illustrating another transition example of the issued token according to the third embodiment.

With reference to FIGS. 20 and 21, the transition example of the issued token will be described below. In the examples in FIGS. 20 and 21, the chain threshold value that is set to the servers is "1."

FIG. 20 is a first diagram illustrating a transition example of the issued token according to the third embodiment. In the first state (ST1), the server 100 issues a token 71 in response to the token issuance request from the terminal device 31. The identifier "a" of the server 100 is set to the issuer of the token 71, and the issuance history is an empty set.

In the second state (ST2), the terminal device 31 transmits the token issuance request added with the token 71 to the server 200. In this case, the server 200 confirms that the issuer of the token 71 is the server 100 and that the number of entries in the issuance history is equal to or smaller than the chain threshold value, and then the server 200 issues a token 72. The identifier "b1" of the server 200 is set to the issuer of the token 72, and "a" is set to the issuance history.

In the third state (ST3), the terminal device 31 transmits the token issuance request added with the token 72 to the server 300. In this case, the server 300 confirms that the issuer of the token 72 is the server 200 and that the number of entries is equal to or smaller than the chain threshold value, and then the server 300 issues a token 73. An identifier "c1" of the server 300 is set to the issuer of the token 73, and "a, b1" is set to the issuance history.

FIG. 21 is a second diagram illustrating a transition example of the issued token according to the third embodiment. In a fourth state (ST4), the terminal device 31 transmits the token issuance request added with the token 73 to the server 200. In this case, the server 200 confirms that the issuer of the token 73 is the server 300 and that the number of entries is equal to or smaller than the own chain threshold value, and then the server 200 issues a token 74. The issuance history of the token 73 includes the identifier "b1" of the server 200. Therefore, the history information of the token 74 deletes the entry following the identifier "b1" from the history information of the token 73. As a result, the identifier "b1" of the server 200 is set to the issuer of the token 74, and "a" is set to the issuance history.

In a fifth state (ST5), the terminal device 31 transmits the token issuance request added with the token 74 to the server 300a. In this case, the server 300a confirms that the issuer of the token 74 is the server 200 and that the number of entries is equal to or smaller than the own chain threshold value, and then the server 300a issues a token 75. An identifier "c2" of the server 300a is set to the issuer of the token 75, and "a, b1" is set to the issuance history.

In this manner, the issuance history of the token 74 that is issued by the server 200 for the second time in the chained-issuance process of the token is similar to the token 72 issued for the first time. Therefore, if the token issuance request added with the token 74 is transmitted to another server 300a, the server 300*a* determines that the number of times of the chained-issuance (the entry number of the issuance history) is 1 and then issues another token 75. As a result, the user 21 using the terminal device 31 is able to receive the provision of service from the server 300*a* as well. That is, each user is able to use the service provided by the server of which the distance between each user and the server is within a prescribed range (chain threshold value) regardless of the process in which the token chained-issuance is performed. Here, the distance means the number of servers chained-issuing the token between the server by which the user is authenticated and the server that receives the token issuance request.

For example, in the examples illustrated in FIGS. 20 and 21, the terminal device 31 transmits the token issuance request in an order of a server 100, a server 200, a server 300, and a server 200, and a server 300*a*. At this time, the number of times of the chained-issuance based on the issuance history of the tokens 71 to 75 issued from the servers is "0," "1," "2," "1," and "2." Therefore, the number of times of the chained-issuance may accurately indicate the distance to the server that performs the user authentication.

A fourth embodiment will be described below. In the fourth embodiment, according to the relationship between the servers, a role is set to each user and the service in the range according to the role is provided.

The system configuration according to the fourth embodiment is substantially the same as the configuration according to the second embodiment illustrated in FIGS. 3 to 7. With reference to the numerals of the elements illustrated in FIGS. 3 to 7, the fourth embodiment will be described below.

Figure 22:
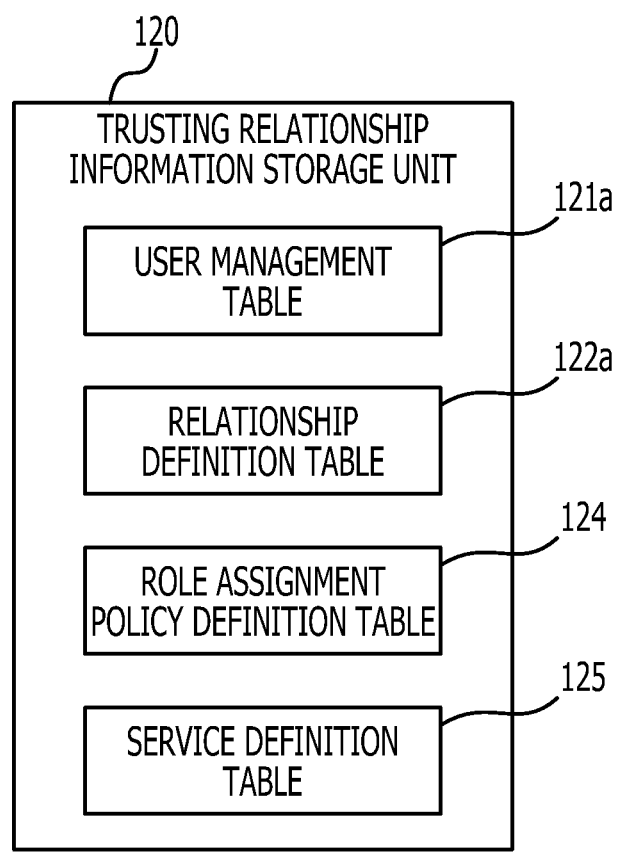
FIG. 22 is a diagram illustrating an example of storage information of a trusting relationship information storage unit according to a fourth embodiment.

FIG. 22 is a diagram illustrating an example of storage information of the trusting relationship information storage unit according to the fourth embodiment. According to the fourth embodiment, the trusting relationship information storage unit 120 stores a user management table 121*a*, a relationship definition table 122*a*, a role assignment policy definition table 124, and a service definition table 125.

Figure 23:
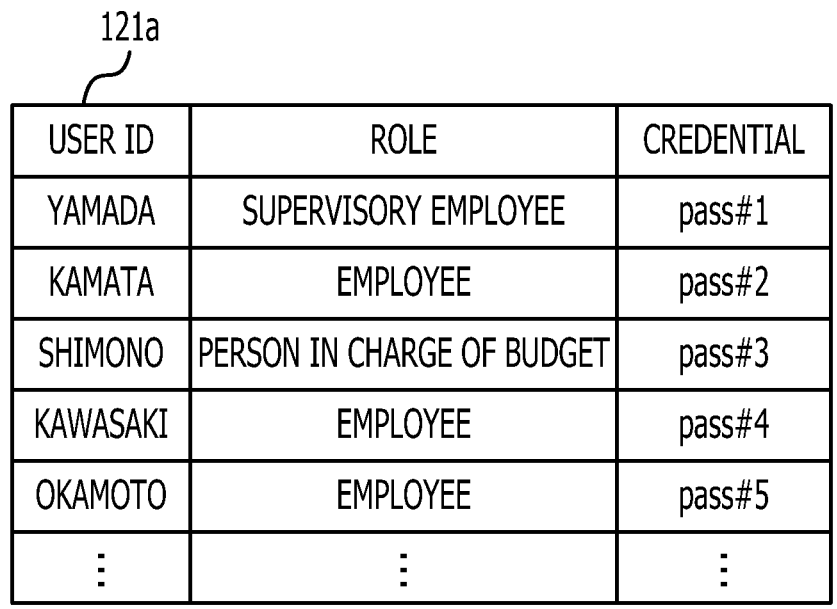
FIG. 23 is a diagram illustrating an example of a data structure of a user management table according to the fourth embodiment.

FIG. 23 is a diagram illustrating an example of a data structure of the user management table according to the fourth embodiment. The user management table 121*a* has columns for a user ID, a role, and a credential.

The identifier of the user is set to the column for the user ID. The role of the user on the service "service A" provided by the server 100 is set to the column for the role. The credential information used for user authentication is set to the column for the credential.

FIG. 24 is a diagram illustrating an example of the data structure of the relationship definition table according to the fourth embodiment. The relationship definition table 122*a* has a column for a partner's URL and a relationship with the partner.

In the column for the partner's URL, the URL that is assigned to the service provided by the server (the partner server) managed by another organization with the direct trusting relationship with the organization that manages the server 100 is set. In the column for the relationship with the partner, the relationship between the organization that manages the server 100 and the organization that manages the partner's server is set. The relationship with the partner is, for example, a business partner, a subsidiary company, a consolidated company, or the like.

FIG. 25 is a diagram illustrating an example of the data structure of the role assignment policy definition table. The role assignment policy definition table 124 has columns for a relationship with a partner, a role authenticated by the partner, a chain threshold value, and a role authenticated by the server 100.

In the column for the relationship with the partner, a relationship between an organization that manages the server 100 and an organization that manages the partner's server is set. In the column for the role authenticated by the partner, the role that is set to the user in the partner's server is set. In the column for the chain threshold value, the threshold value of the number of times of the chained-issuance of the token issuance corresponding to a pair of the relationship with the partner and the role authenticated by the partner is set. If the column for the chain threshold value is blank, the chained-issuance of the token is permitted with no limitation. In the column for the role authenticated by the server 100, the role that is assigned by the server 100 for the user having the role on the service provided by the partner's server is set.

Figure 26:
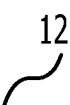
FIG. 26 is a diagram illustrating an example of a data structure of a service definition table.

FIG. 26 is a diagram illustrating an example of the data structure of the service definition table. The service definition table 125 has columns for the role and the service content. The data arranged in a row direction in each of the columns is included in a record that defines the service content according to the role.

In the column for the role, the role of the user is set. In the column for the service content, the service content provided to the user having the corresponding role is set. As the service content, for example, it is defined whether the access to all the data in the DB 110 is permitted or whether the access is limited to some data with a certain attribute. For example, if the role of the user is a person in charge of budget, the service content is set in such a way that the access to budget-related data is permitted. If the role of the user is an employee, for example, the service content is set in such a way that the access to the name list of all the employees of the company that manages the server 100 is permitted. If the role is an employee of a subsidiary company, for example, the service content is set in such a way that the access to the name list of the representatives of each department of the company that manages the server 100 is permitted.

Figure 27:
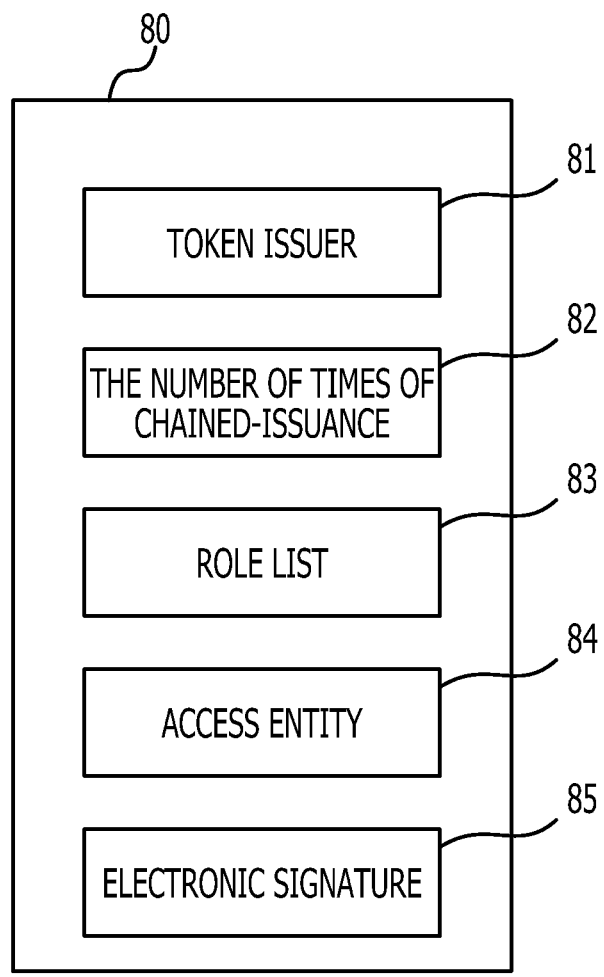
FIG. 27 is a diagram illustrating an example of information included in a token according to the fourth embodiment.

The content of the token used in the fourth embodiment will be described below. FIG. 27 is a diagram illustrating an example of information included in the token according to the fourth embodiment. A token 80 includes a token issuer 81, a number of times of chained-issuance 82, a role list 83, an access entity 84, and an electronic signature 85.

The token issuer 81 is the identifier of the server that issues the token. The number of times of chained-issuance 82 is the number of times of the chained-issuance of the token based on the token issued by another server. The role list 83 is a list of roles authenticated by the issuer as a role of the user. When the user plays a plurality of roles, the plurality of roles is set in the list. The access entity 84 is the identifier of the user who performs access. The electronic signature 85 is a piece of information that is added by the issuer of the token 80 to guarantee the correctness of the token 80.

Figure 28:
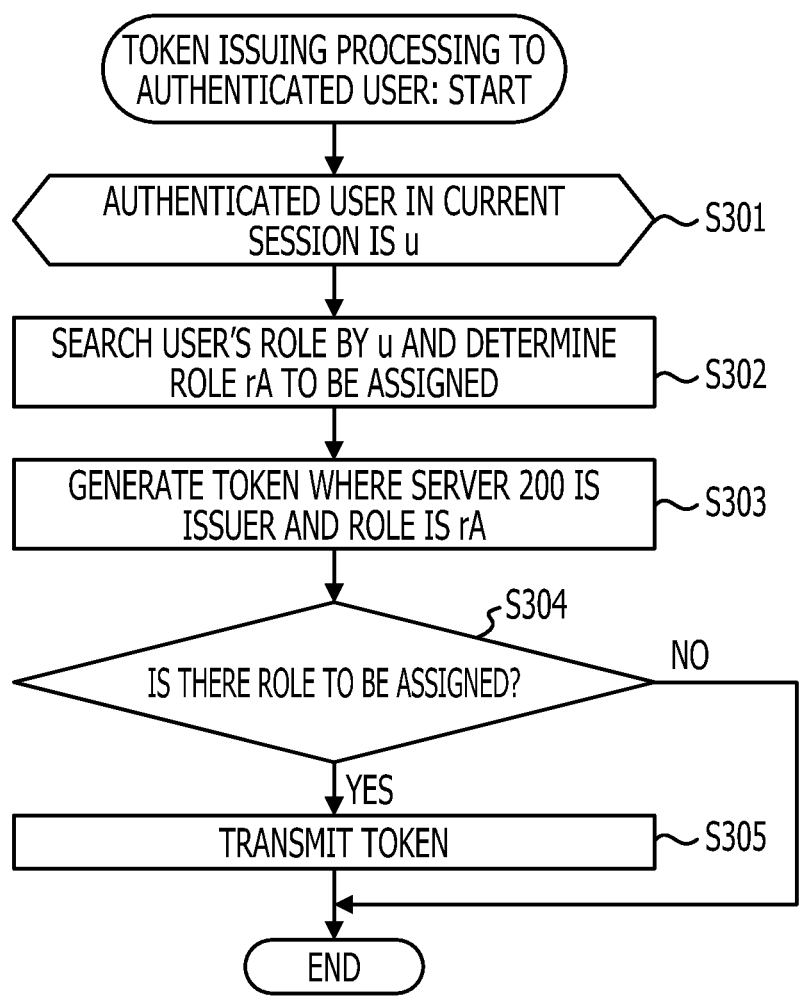
FIG. 28 is a flowchart illustrating an example of the procedure of the token issuing processing to a user that is authenticated by a server 200.

The procedure of the token issuing processing to the user authenticated by the server 200 will be described in detail below. FIG. 28 is a flowchart illustrating an example of the procedure of the token issuing processing to the user authenticate by the server 200. The processing illustrated in FIG. 8 will be described below according to the order of the operation numbers. The processing described below is performed by the server 100 that receives the token issuance request from the terminal device 31 used by the user 21 who already received the user authentication.

[Operation S301] The authentication unit 130 has u as the authenticated user in the current session.

[Operation S302] The authentication unit 130 retrieves the record corresponding to the user u in the user management table 121*a* and determines a role rA of the user.

[Operation S303] The authentication unit 130 generates a token where the server 200 is the issuer and the role is rA.

[Operation S304] The authentication unit 130 determines whether there is a role to be assigned. For example, the authentication unit 130 determines there is a role to be assigned if the role is set to the record detected by the retrieval in Operation S302. If the role is not set to the record detected by the retrieve in Operation S302, the authentication unit 130 determines that there is no role. If there is a role to be assigned, the authentication unit 130 proceeds the processing to Operation S305. If there is no role to be assigned, the authentication unit 130 ends the processing without transmitting the token.

[Operation S305] The authentication unit 130 transmits the token generated in Operation S303 to the terminal device 31. In this procedure, the server 100 of which the account is held by the user 21 issues the token.

The procedure of the token generating processing based on the relationship with another server performed by the server 100 according to the token issuance request added with the token issued by the server 200.

Figure 29:
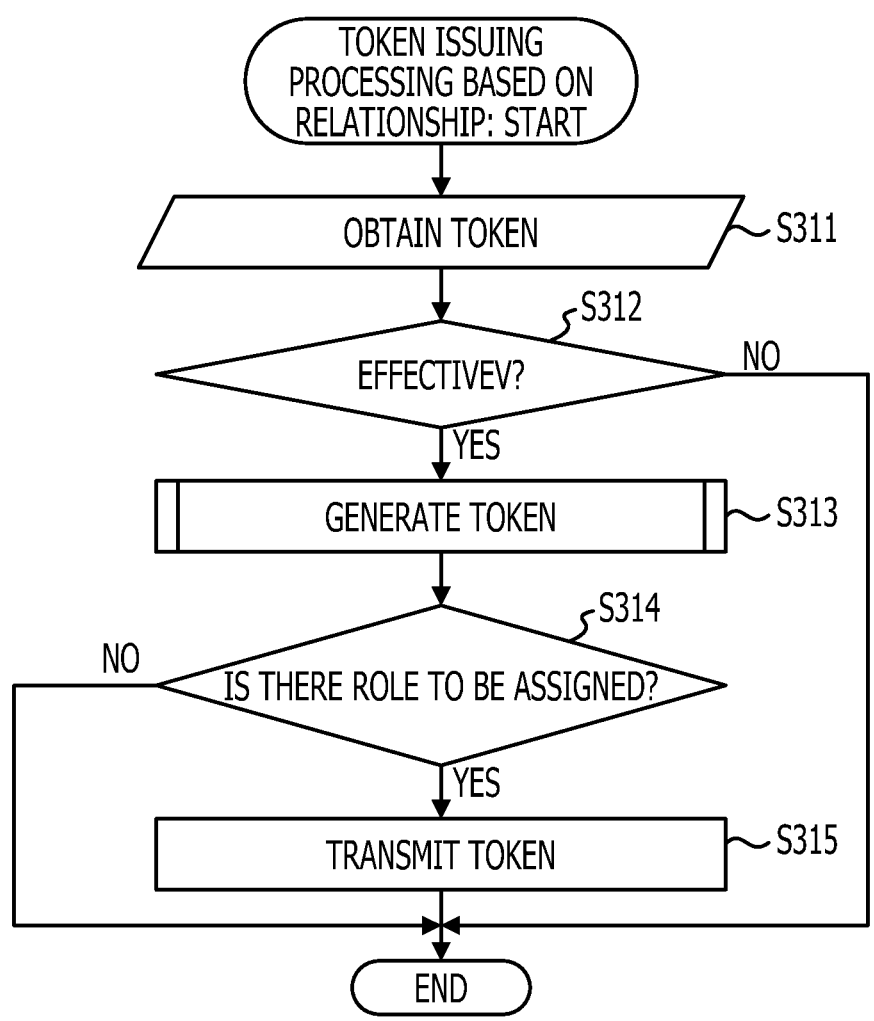
FIG. 29 is a flowchart illustrating an example of the procedure of the token issuing processing based on the relationship.

FIG. 29 is a flowchart illustrating an example of the procedure of the token issuing processing based on the relationship. The processing illustrated in FIG. 29 will be described according to the order of the operation numbers. [Operation S311] The authentication unit 130 obtains the token issued by the server 200.

[Operation S312] The authentication unit 130 determines whether the obtained token is effective. For example, if the correct electronic signature is added to the token, the authentication unit 130 determines that the token is effective. If the token is effective, the authentication unit 130 proceeds the processing to Operation S313. If the token is ineffective, the authentication unit 130 ends the processing without issuing the token.

[Operation S313] The authentication unit 130 generates a token. The details of the processing will be described (see FIG. 30).

[Operation S314] The authentication unit 130 determines whether there is a role to be assigned. For example, based on the result from the token generating processing, if the token of which the role in the service provided by the server 100 is set is generated, the authentication unit 130 determines that there is a role. If the token generation fails due to non-existence of a role in the token generating processing, the authentication unit 130 determines that there is no role. If there is a role, the authentication unit 130 proceeds the processing to Operation S315. If there is no role, the authentication unit 130 ends the processing without issuing the token.

[Operation S315] The authentication unit 130 transmits the token generated in Operation S313 to the terminal device as the transmitting source of the token issuance request. The procedure of the token issuing processing based on the relationship according to the fourth embodiment is substantially the same as the procedure of the processing according to the second embodiment illustrated in FIG. 11. The fourth embodiment is different from the second embodiment in that the details of the token generating processing (Operation S145) are different from the processing illustrated in FIG. 11.

Figure 30:
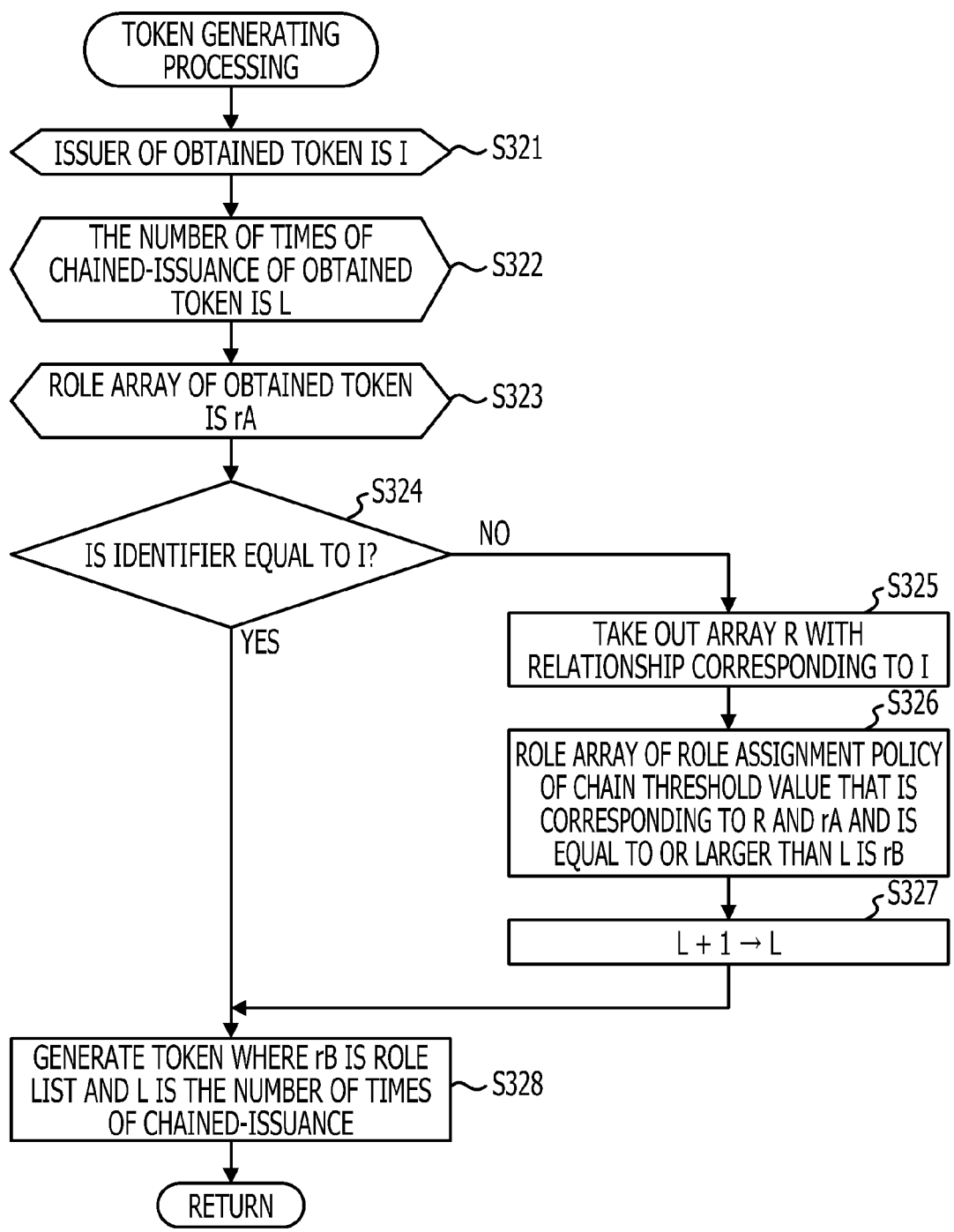
FIG. 30 is a flowchart illustrating an example of the procedure of the token generating processing according to the fourth embodiment.

Below is a procedure of the token generating processing according to the fourth embodiment. FIG. 30 is a flowchart illustrating an example of the procedure of the token generating processing according to the fourth embodiment. The processing illustrated in FIG. 30 will be described according to the order of the operation numbers.

[Operation S321] The authentication unit 130 has I as the issuer of the obtained token.

[Operation S322] The authentication unit 130 has L as the number of times of the chained-issuance of the obtained token.

[Operation S323] The authentication unit 130 has rA as the role assignment array that is set to the role list of the obtained token.

[Operation S324] The authentication unit 130 determines whether the identifier (the URL or the like) of the server 100 is equal to I. If yes, the authentication unit 130 proceeds the processing to Operation S328. If no, the authentication unit 130 proceeds the processing to Operation S325.

[Operation S325] The authentication unit 130 checks I against the partner's URL in the relationship definition table 122a and then takes out an array R with the relationship corresponding to I.

[Operation S326] The authentication unit 130 retrieves the record corresponding to the pair of R and rA from the role assignment policy definition table 124. The authentication unit 130 narrows, by L, the record obtained by the retrieval. For example, the authentication unit 130 narrows the record obtained by the retrieval into the record of which the chain threshold value is equal to or larger than L. The authentication unit 130 has rB as the array of the authenticated roles in each of the narrowed records.

[Operation S327] The authentication unit 130 adds one to the value of L to obtain a new L.

[Operation S328] The authentication unit 130 generates a token where the own identifier is an issuer, rB is the role list, and L is the number of times of the chained-issuance.

In this manner, the roles on the service provided by the sever according to the pair of the relationship with another server and the role of the user in the other server may be assigned to a user who is authenticated by the other server. For example, an employee of the subsidiary company may be provided with the service in a wider range compared to an employee of the sub-subcontractor.

Further, according to the pair of the relationship of the other server and the role of the user in the server, the chain threshold value may be set. Therefore, delicate token issuance management for each role of the user may be performed. For example, the token may be issued to the user who is assigned with the role "employee of subsidiary company" in the server of the subsidiary company where the chain threshold value of "employee of sub-subcontractor" is "1." If the chain threshold value of "employee of subsidiary company of associated company" is "0" with respect to the user assigned with the role "employee of subsidiary company" in the server of the associated company (the role "employee of subsidiary company of associated company in the own server).

A fifth embodiment will be described below. According to the fifth embodiment, instead of the number of times of the chained-issuance according to the fourth embodiment, the issuance history is included in the token.

The system configuration according to the fifth embodiment is equivalent to the configuration according to the second embodiment illustrated in FIGS. 3 to 7. By using the numerals of the elements illustrated in FIGS. 3 to 7, the fifth embodiment will be described below.

Figure 31:
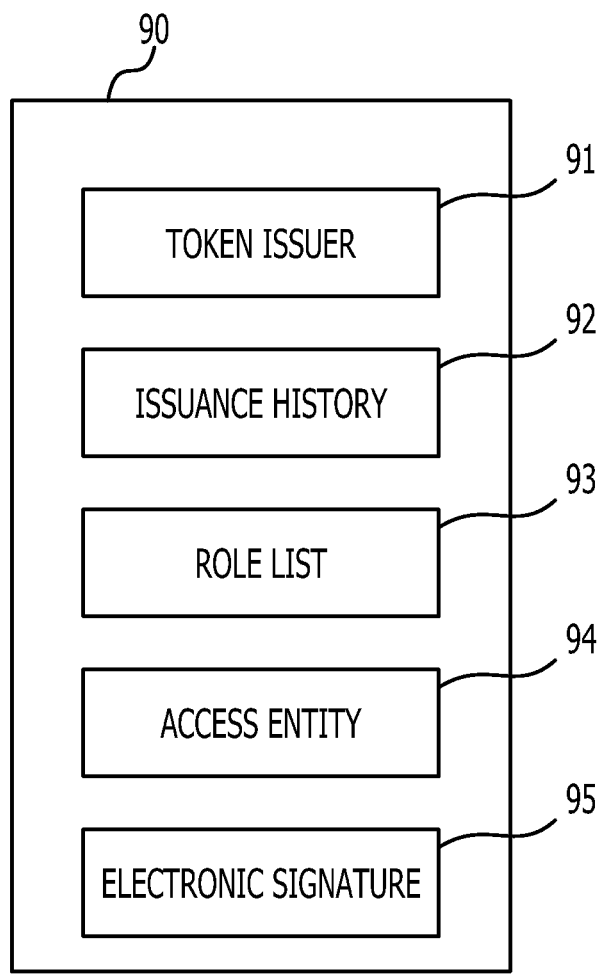
FIG. 31 is a diagram illustrating an example of information included in a token according to a fifth embodiment.

FIG. 31 is a diagram illustrating an example of the information included in the token according to the fifth embodiment. A token 90 includes a token issuer 91, an issuance history 92, a role list 93, an access entity 94, and an electronic signature 95.

The token issuer 91 is the identifier of the server that issues the token. The issuance history 92 is a list of identifiers of the server that performs the chain-issuance of the token in a process starting from the token issuance by the server that authenticated the user until the issuance of the token 90. The content of the issuance history 92 is equivalent to the issuance history 62 according to the second embodiment illustrated in FIG. 17. The role list 93 is a list of the roles authenticated by the issuer as a role of the user. The access entity 94 is the identifier of the user who performs the access. The electronic signature 95 is information that is added by the issuer of the token 90 to guarantee the correctness of the token 90.

The effectiveness determining processing and the token generating processing are different in the fourth embodiment and the fifth embodiment. The procedure of the effectiveness determining processing is equivalent to the effectiveness determining processing according to the second embodiment illustrated in FIG. 18. The procedure of the token generating processing according to the fifth embodiment will be described below.

FIG. 32 is a flowchart illustrating an example of the procedure of the token generating processing according to the fifth embodiment. The processing illustrated in FIG. 32 will be described below according to the order of the operation numbers.

[Operation S401] The authentication unit 130 has I as the issuer of the obtained token.

[Operation S402] The authentication unit 130 defines the array h with the entries of the issuance history of the obtained token as elements.

[Operation S403] The authentication unit 130 has rA as the role array that is set to the role list of the obtained token.

[Operation S104] The authentication unit 130 determines whether the identifier (the URL or the like) of the server 100 is equal to I. If yes, the authentication unit 130 proceeds the processing to Operation S405. If no, the authentication unit 130 proceeds the processing to Operation S406.

[Operation S405] If the issuer I of the obtained token is the server 100, the authentication unit 130 has an array rB instead of the array rA. After that, the authentication unit 130 proceeds the processing to Operation S412.

[Operation S406] The authentication unit 130 matches I against the partner's URL in the relationship definition table 122a and then takes out the array R with the relationship corresponding to I.

[Operation S407] The authentication unit 130 determines whether the identifier of the server 100 is included in the array h. If yes, the authentication unit 130 proceeds the processing to Operation S408. If no, the authentication unit 130 proceeds the processing to Operation S409.

[Operation S408] The authentication unit 130 deletes the entry following the entry to which the identifier of the server 100 in the array h is set. At this time, the entry to which the identifier of the server 100 is set is deleted. After that, the authentication unit 130 proceeds the processing to Operation S410.

[Operation S409] The authentication unit 130 adds I as an entry to the array h.

[Operation S410] The authentication unit 130 has the number of times of the chain-issuance L as the number of entries of the array h.

[Operation S411] The authentication unit 130 retrieves the record corresponding to the pair of R and rA from the role assignment policy definition table 124. The authentication unit 130 narrows, by L, the record obtained by the retrieval. For example, the authentication unit 130 narrows the record obtained by the retrieval into the record of which the chain threshold value is equal to or larger than L. The authentication unit 130 has rB as the array of the authenticated roles in each of the narrowed records.

[Operation S412] The authentication unit 130 generates a token where the identifier of the server is the issuer, rB is the role list, and h is the issuance history. In this manner, according to the pair of the relationship with the other server and the role of the user, the role on the service provided by the server may be assigned to the user authenticated by another server. For example, the service may be provided to an employee of the subsidiary company in a wider range compared to an employee of the sub-subcontractor.

According to the pair of the relationship of the other server and the role of the user in the server, the chain threshold value may be set. At this time, by using the issuance history, each user is able to use the service provided by the server of which the distance between each user and the server is within a prescribed range (chain threshold value) regardless of the process in which the token chained-issuance is performed.

According to the fourth and fifth embodiments, the role of the user on the service provided by the server is determined according to the pair of the role of the user assigned by the server as the issuing source of the obtained token and the relationship between the server and the own server. However, the role may be determined by other methods. For example, the role may be determined according to the number of times of chain-issuance of token. In this case, as the number of times of the chained-issuance increases, when the user who is authenticated by the server with a more tenuous relationship with the own server where the role with more limits of the content of the service that may be provided is set, the limitation of the contents of the service to be provided may be strict.

According to the second and third embodiments, the common chain threshold value among the servers is used. However, for example, the chain threshold value may be defined in each of the servers with the direct trusting relationship. For example, in the relationship definition table 122 illustrated in FIG. 7, the chain threshold value corresponding to the each of the partner's URLs is set. In this case, in Operation S153 in the effectiveness determining processing illustrated in FIG. 12, the chain threshold value corresponding to the issuer of the obtained token is compared to the number of times of chain-issuance.

The processing function illustrated in the embodiments may be realized by a computer. To realize the processing function by the computer, a program in which the processing content of the functions of each of the servers is written is provided. By executing the program in the computer, the above-described processing function is realized on the computer. The program in which the processing content is written may be recorded in a computer readable recording medium. The computer-readable recording medium is, for example, a magnetic storage device, an optical disk, a magnetic optical recording medium, a semiconductor memory, or the like. The magnetic storage device is, for example, a hard disk device (HDD), a flexible disk (FD), a magnetic tape, or the like. The optical disk is, for example, a DVD, a DVD-RAM, a CD-ROM/RW, or the like. The optical magnetic recording medium is, for example, a Magneto-Optical disk (MO) or the like. The recording medium that records a program does not include a temporal propagation signal.

To distribute the program, for example, portable recording mediums such as DVDs, CD-ROMs, and the like in which the program is recorded are sold. The program is stored in a storage device in a server computer and is then transferred from the server computer to another computer through a network.

For example, the computer that executes the program stores, in the storage device thereof, the program recorded in the portable recording medium or the program transferred from the server computer. The computer reads the program from the storage device thereof and then performs the processing in accordance with the program. The computer may directly read the program from the potable recording medium and then performs the processing in accordance with the program. Every time the program is transferred from the server computer, the computer may perform the processing in accordance with the received program.

The computer is able to realize at least part of the above-described processing functions by an electric circuit such as a Digital Signal Processor (DSP), an Application Specific Integrated Circuit (ASIC), a Programmable Logic Device (PLD), or the like.

Although the embodiments have been described above, the configuration of each unit illustrated in the embodiments may be replaced by another configuration with the similar functions. Arbitrary components and procedures may be added to the configuration. Two or more configurations in the above-described embodiments may be combined.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A service usage management method executed by a plurality of information processing devices each configured to transmit an authentication information to a terminal device, the service usage management method comprising:
    receiving by a first of the plurality of information processing devices, from the terminal device used by a user, an authentication information for authenticating a user's right to use a service provided by an issuing source of the authentication information, the authentication information including an identifier of the issuing source and a count value indicating a number of information processing devices being different from each other which previously issued the authentication information to the terminal device, for each of the plurality of information processing devices, issuing the authentication information to the terminal device in response to previously receiving the previously issued authentication information from the terminal device, wherein the terminal device transmits the authentication information to a next of the plurality of information processing devices in response to the issuing;
    generating an updated authentication information from the transmitted authentication information for authenticating the user's right to use the service provided by the information processing device when the identifier of the issuing source is different from an identifier of the next information processing device;
    updating the count value based on the generating;
    transmitting the generated authentication information to the terminal device; and
    accessing, by the terminal device, the service using the updated authentication information in response to receiving the transmitted updated authentication information.

2. The service usage management method according to claim 1, wherein the authentication information includes a list of identifiers of the device which issues the authentication information and indicates the number of times of the issuing processing of the authentication information by the number of the identifiers of the device in the list, wherein, when generating the authentication information, the information processing device counts the number of the identifiers in the list included in the received authentication information, recognizes the number of times of the issuing processing performed on the authentication information, updates the list included in the received authentication information, and includes the updated list in the generated authentication information.

3. The service usage management method according to claim 2, wherein, when generating the updated authentication information, the information processing device determines whether the list included in the received authentication information includes the identifier of the information processing device, and
    wherein when it is determined that the list includes the identifier of the information processing device, the information processing device determines that the list, which is obtained by deleting one or more identifiers following the identifier of the information processing device from the list, is the updated list.

4. The service usage management method according to claim 1, further comprising:
    setting a threshold of the count value; and
    suppressing the generating of the updated authentication information when the count value included in the received authentication information is more than the threshold.

5. The service usage management method according to claim 2, wherein the authentication information further includes an electronic signature that uniquely indicates an authentication information issuer and detects falsification of the authentication information when the authentication information is falsified.

6. The service usage management method according to claim 1, wherein, when generating the authentication information, the information processing device determines whether the number of times indicated in the received authentication information is equal to or smaller than a threshold value which is set in advance, and
    wherein when the number of times is not equal to or smaller than the threshold value, the information processing device suppresses generation of the authentication information.

7. The service usage management method according to claim 1, wherein, when generating the authentication information, the information processing device refers to a piece of relationship information to which the identifier of the device with a relationship with the information processing device is set, and
    wherein when the identifier of the device as the issuing source of the received authentication information is not registered in the relationship information, the information processing device suppresses the generation of the authentication information.

8. The service usage management method according to claim 4, wherein the authentication information indicates a role of the user on the service provided by the issuing source, and
    wherein the setting includes setting the threshold based on the role of the user and a relationship between the information processing device and the issuing source.

9. A non-transitory computer-readable recording medium storing a program that causes a processor to execute an operation, the operation comprising:

receiving by a first of a plurality of information processing devices, from a terminal device used by a user, an authentication information for authenticating a user's right to use a service provided by an issuing source of the authentication information, the authentication information including an identifier of the issuing source and a count value indicating a number of information processing devices being different from each other which previously issued the authentication information to the terminal device, for each of the plurality of information processing devices, issuing the authentication information to the terminal device in response to previously receiving the previously issued authentication information from the terminal device, wherein the terminal device transmits the authentication information to a next of the plurality of information processing devices in response to the issuing;

generating an updated authentication information from the transmitted authentication information for authenticating the user's right to use the service provided by the information processing device when the identifier of the issuing source is different from an identifier of the next information processing device;

updating the count value based on the generating; and transmitting the generated authentication information to the terminal device, wherein the terminal device accesses the service using the updated authentication information in response to receiving the transmitted updated authentication information.

10. An information processing device comprising:

a memory, and a processor to execute an operation by executing a program stored in the memory, the operation including:

receiving by a first of a plurality of information processing devices configured to transmit an authentication information to a terminal device, from the terminal device used by a user, an authentication information for authenticating a user's right to use a service provided by an issuing source of the authentication information, the authentication information including an identifier of the issuing source and a count value indicating a number of information processing devices being different from each other which previously issued the authentication information to the terminal device, for each of the plurality of information processing devices, issuing the authentication information to the terminal device in response to previously receiving the previously issued authentication information from the terminal device, wherein the terminal device transmits the authentication information to a next of the plurality of information processing devices in response to the issuing;

generating an updated authentication information from the transmitted authentication information for authenticating the user's right to use the service provided by the information processing device when the identifier of the issuing source is different from an identifier of the next information processing device;

updating the count value based on the generating; and transmitting the generated authentication information to the terminal device, wherein the terminal device accesses the service using the updated authentication information in response to receiving the transmitted updated authentication information.

11. The service usage management method according to claim 1, wherein the count value is increased when a chained-issuance of an authentication information is conducted by each of a plurality of information processing devices related to the information processing device.

* * * * *